(12) United States Patent
Ueda et al.

(10) Patent No.: US 7,508,385 B2
(45) Date of Patent: Mar. 24, 2009

(54) LIQUID CRYSTAL DISPLAY DEVICE AND DRIVING METHOD OF THE SAME

(75) Inventors: Kazuya Ueda, Kawasaki (JP); Hidefumi Yoshida, Kawasaki (JP); Yuichi Inoue, Kawasaki (JP); Yoshio Koike, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 544 days.

(21) Appl. No.: 10/375,904

(22) Filed: Feb. 26, 2003

(65) Prior Publication Data

US 2003/0160750 A1     Aug. 28, 2003

(30) Foreign Application Priority Data

Feb. 27, 2002    (JP)   ............... 2002-052303

(51) Int. Cl.
    *G09G 3/201*      (2006.01)
(52) U.S. Cl. ............... 345/204; 345/50; 345/63; 345/87; 345/205
(58) Field of Classification Search ........... 345/92, 345/690–697, 43, 50, 63, 87, 204, 205; 349/43
See application file for complete search history.

(56) References Cited

U.S. PATENT DOCUMENTS

| | | | | |
|---|---|---|---|---|
| 4,373,784 A | * | 2/1983 | Nonomura et al. | 349/145 |
| 4,778,257 A | * | 10/1988 | Takamatsu et al. | 349/144 |
| 5,200,846 A | | 4/1993 | Hiroki et al. | |
| 5,285,300 A | * | 2/1994 | Suzuki et al. | 349/187 |
| 5,406,398 A | * | 4/1995 | Suzuki et al. | 349/154 |
| 5,459,495 A | * | 10/1995 | Scheffer et al. | 345/690 |
| 5,831,587 A | * | 11/1998 | Kanbe et al. | 345/97 |
| 6,188,459 B1 | * | 2/2001 | Kim | 349/141 |
| 6,201,588 B1 | * | 3/2001 | Walton et al. | 349/123 |
| 6,519,013 B1 | * | 2/2003 | Nagai et al. | 349/33 |

(Continued)

FOREIGN PATENT DOCUMENTS

CN      1388403      1/2003

(Continued)

*Primary Examiner*—Bipin Shalwala
*Assistant Examiner*—Vince E Kovalick
(74) *Attorney, Agent, or Firm*—Greer, Burns & Crain, Ltd

(57) ABSTRACT

The invention relates to a liquid crystal display device used for a display part of an information equipment and a driving method thereof, and has an object to provide a liquid crystal display device in which excellent viewing angle characteristics can be obtained and a driving method thereof. When a relatively high level data voltage is applied to a gate electrode of a TFT, a driving voltage is applied to a liquid crystal layer for a long time and a white display is realized. When a relatively low level data voltage is applied to the gate electrode of the TFT, the driving voltage is not applied to the liquid crystal layer, and a black display is realized. When an intermediate data voltage between the high level and the low level is applied to the gate electrode of the TFT, the TFT keeps an on state for a time determined by a time constant depending on a capacitance and a resistance. The driving voltage is applied to the liquid crystal layer for the on time. By this, a half tone display is realized according to the ratio of the on time of the TFT in one frame period.

16 Claims, 23 Drawing Sheets

U.S. PATENT DOCUMENTS

| | | | |
|---|---|---|---|
| 6,639,576 B2 * | 10/2003 | Miyazawa et al. | 345/92 |
| 6,667,732 B1 * | 12/2003 | Katase | 345/103 |
| 6,721,024 B1 * | 4/2004 | Kishimoto et al. | 349/123 |
| 2001/0043305 A1 * | 11/2001 | Ohmuro et al. | 349/143 |
| 2002/0021401 A1 * | 2/2002 | Kataoka | 349/178 |
| 2002/0036610 A1 * | 3/2002 | Ito et al. | 345/89 |
| 2002/0063833 A1 | 5/2002 | Yoo et al. | |
| 2002/0109659 A1 * | 8/2002 | Hiroki | 345/92 |

FOREIGN PATENT DOCUMENTS

| | | |
|---|---|---|
| JP | 56-42281 | 4/1981 |
| JP | 04-142592 | 5/1992 |
| JP | 05-066735 | 3/1993 |
| JP | 6-202080 | 7/1994 |
| JP | 07-064092 | 3/1995 |
| JP | 08-054605 | 2/1996 |
| JP | 08-101667 | 4/1996 |
| JP | 09-101506 | 4/1997 |
| JP | 2000-314891 | 11/2000 |
| JP | 2001-159883 | 6/2001 |
| JP | 2001-343941 | 12/2001 |
| KR | 2002-0012737 A | 2/2002 |

* cited by examiner

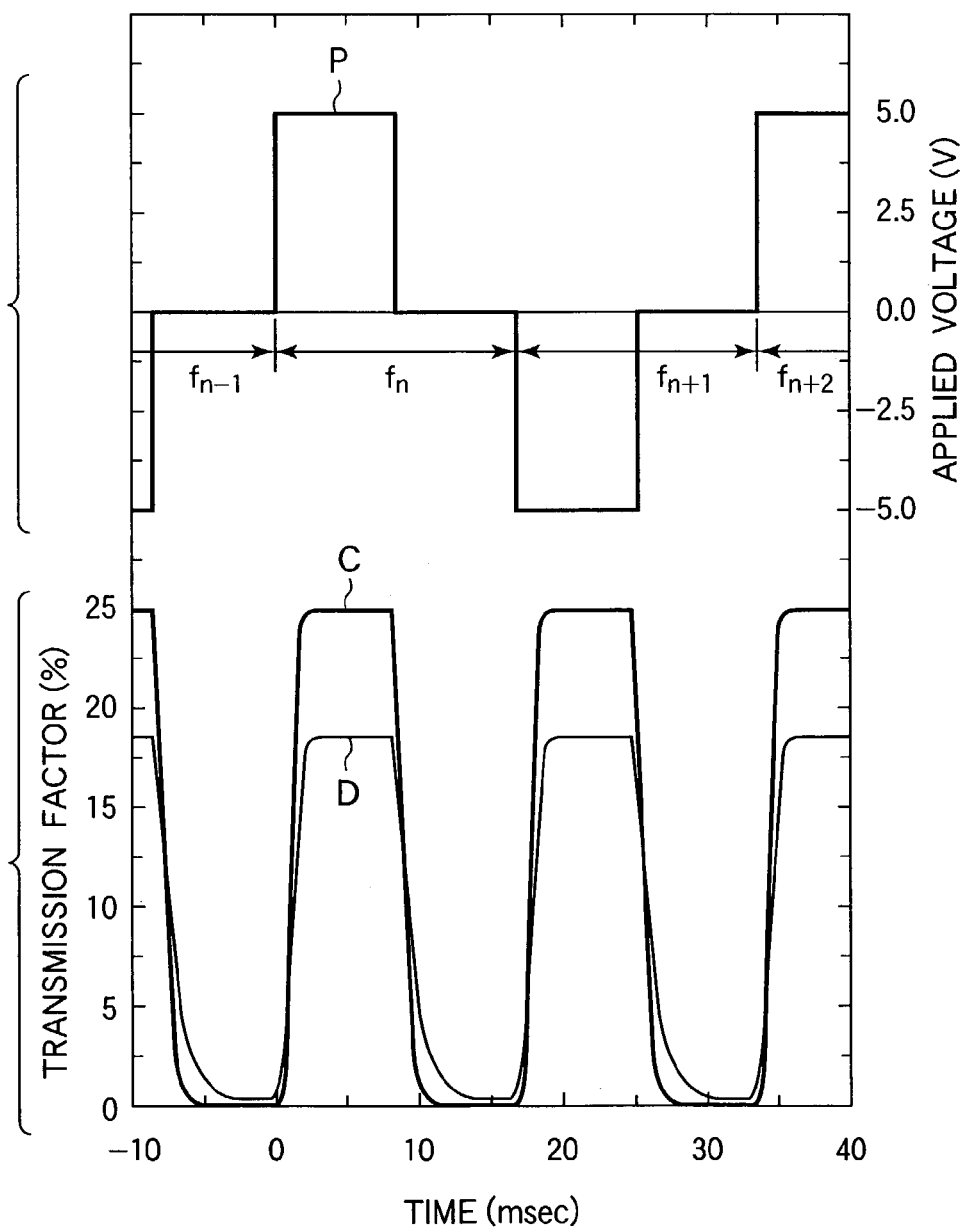

ONE FRAME

ONE FRAME

LIQUID CRYSTAL DISPLAY DEVICE AND DRIVING METHOD OF THE SAME

BACKGROUND OF THE INVENTION

1. Field of the Invention

The present invention relates to a liquid crystal display device used for a display part of an information equipment or the like, and a driving method of the same.

2. Description of the Related Art

In recent years, a liquid crystal display device has been improved so as to have a large size, high gradation, and high contrast, and has been used for a monitor of a PC (Personal Computer) or a television receiver or the like. In these uses, such excellent viewing angle characteristics that a display screen can be seen in any directions are required.

Since a color liquid crystal display device is yet inferior to a CRT (Cathode-Ray Tube) in the viewing angle characteristics, the realization of a wide viewing angle is desired. As a method of widening the viewing angle of the liquid crystal display device, there is an MVA (Multi-domain Vertical Alignment) mode. FIGS. 27A and 27B show the schematic sectional construction of a liquid crystal display device of the MVA mode. FIG. 27A shows a state where a voltage is not applied to a liquid crystal layer, and FIG. 27B shows a state where a predetermined voltage is applied to the liquid crystal layer. As shown in FIGS. 27A and 27B, the liquid crystal display device includes substrates 302 and 304 disposed to be opposite to each other. Transparent electrodes (not shown) are formed on both the substrates 302 and 304. Besides, plural linear protrusions 306 parallel to each other are formed on the one substrate 302, and plural linear protrusions 308 parallel to each other are formed on the other substrate 304. The protrusions 306 and 308 are alternately arranged when viewed in a direction vertical to a substrate surface.

A liquid crystal layer 160 having a negative dielectric anisotropy is sealed between both the substrates 302 and 304. As shown in FIG. 27A, liquid crystal molecules 312 are aligned almost vertically to the substrate surface by the alignment regulating force of vertical alignment films (not shown) formed on opposite surfaces of both the substrates 302 and 304. The liquid crystal molecules 312 in the vicinity of the protrusions 306 and 308 are aligned almost vertically to oblique surfaces formed by the protrusions 306 and 308. That is, the liquid crystal molecules 312 in the vicinity of the protrusions 306 and 308 are aligned obliquely with respect to the substrate surfaces.

As shown in FIG. 27B, when the predetermined voltage is applied between the transparent electrodes of both the substrates 302 and 304, the liquid crystal molecules 312 in the vicinity of the protrusions 306 and 308 are inclined in the directions vertical to the extending directions of the protrusions 306 and 308. The inclination is propagated to the respective liquid crystal molecules 312 between the protrusions 306 and 308, and the liquid crystal molecules 312 in a region between the protrusions 306 and 308 are inclined in the same direction.

As stated above, by disposing alignment regulating structures such as the protrusions 306 and 308, inclination directions of the liquid crystal molecules 312 can be regulated for each region. When the alignment regulating structures are formed in two directions almost vertical to each other, the liquid crystal molecules 312 are inclined in four directions in one pixel. As a result of the mixture of viewing angle characteristics of the respective regions, a wide viewing angle in a white display or a black display can be obtained. In the liquid crystal display device of the MVA mode, ten or more contrast ratios are obtained even at an angle of 80° or more in vertical and horizontal directions from a direction vertical to a display screen.

In the liquid crystal display device of the MVA mode, a vertical alignment technique to realize high contrast and high speed response and an alignment dividing technique to realize a wide viewing angle are combined and used. In the alignment dividing technique, the alignment regulating structures, such as the linear protrusions 306 and 308 or electrode removal parts (slits), are formed on the substrates. Since the alignment directions of the liquid crystal molecules 312 are regulated by these alignment regulating structures, and a rubbing treatment which becomes the great cause of a drop in productivity becomes unnecessary, high productivity is realized.

Besides, in order to realize the liquid crystal display device of the MVA mode having higher display quality, there is a technique in which a photo-cured material is formed in a liquid crystal layer 160 so that the alignment regulating force of the liquid crystal molecules 312 is increased. A liquid crystal containing a photo-curing composition (resin) is injected in a liquid crystal display panel, and the photo-cured material is formed in a state where a voltage is applied, so that a predetermined pre-tilt angle can be given to the whole of each of aligned regions divided by the alignment regulating structures. By this, alignment abnormal regions of the liquid crystal molecules 312 are decreased and high transmission factor can be realized, and further, since the propagation of inclination of the liquid crystal molecules 312 becomes almost unnecessary, a high speed response can be realized.

As the alignment regulating structures, in addition to the protrusions 306 and 308 and the slits, there is also a minute electrode pattern. FIG. 28 shows one pixel in which the minute electrode pattern is formed. As shown in FIG. 28, plural gate bus lines 104 (only one line is shown in FIG. 28) extending in the horizontal direction in the drawing, and plural drain bus lines 106 (two lines are shown in the drawing) intersecting with the gate bus lines 104 through a not-shown insulating film and extending in the vertical direction in the drawing are formed on a TFT substrate 102. A TFT 110 is formed in the vicinity of an intersecting position of the gate bus line 104 and the drain bus line 106. Besides, a storage capacitor bus line 108 is formed to cross substantially the center of a rectangular pixel region defined by the gate bus line 104 and the drain bus line 106.

Cross-shaped connection electrodes 120 and 122 are formed in the rectangular pixel region to divide it in four rectangles of the same shape. The connection electrode 122 is formed to cross the center of the pixel region and to be parallel to the drain bus line 106, and the connection electrode 120 is formed on the storage capacitor bus line 108. Besides, plural stripe electrodes 124 are formed which extend from the connection electrodes 120 and 122 at an angle of 45° and form the minute electrode pattern. A space 126 in a state where an electrode is removed is formed between the adjacent stripe electrodes 124. A pixel electrode is constituted by the connection electrodes 120 and 122, the plural stripe electrodes 124 and the spaces 126. Besides, alignment regulating structures are constituted by the stripe electrodes 124 and the spaces 126. Each of the stripe electrodes 124 is formed to have a width L1, and each of the spaces 126 is formed to have a width S1.

FIGS. 29 and 30 show a section of the liquid crystal display device taken along line B-B of FIG. 28. FIG. 29 shows a state where a voltage is not applied to the liquid crystal layer 160, and FIG. 30 shows a state where a voltage is applied to the liquid crystal layer 160. As shown in FIGS. 29 and 30, the TFT substrate 102 includes the stripe electrodes 124 on a glass substrate 150. An opposite substrate 103 disposed to be opposite to the TFT substrate 102 includes a common electrode 154 on a glass substrate 151. Vertical alignment films 152 and 153 are formed on surfaces of the TFT substrate 102 and the opposite substrate 103 in contact with the liquid crystal layer 160, respectively.

In the state where the voltage is not applied to the liquid crystal layer 160, as shown in FIG. 29, the liquid crystal molecules 312 are aligned almost vertically to the substrate surface. In the state where the voltage is applied to the liquid crystal layer 160, as shown in FIG. 30, the liquid crystal molecules 312 are inclined toward the connection electrodes 122 and 124 in the extending directions of the stripe electrodes 124, and are aligned almost parallel to the substrate surface.

Also by the construction shown in FIG. 28, by dividing the alignment directions of the liquid crystal molecules 312 in quarters in one pixel, a wide viewing angle is obtained in a white display or a black display. However, since the alignment regulating force of the liquid crystal molecules 312 caused by only the minute electrode pattern is low, similarly to the above, a photo-cured material is formed in the liquid crystal layer 160 and the alignment regulating force is increased. The photo-cured material is formed in such a way that a photo-curing composition (monomer) capable of being polymerized by light is mixed in the liquid crystal layer 160, and irradiated by light such as ultraviolet rays (UV) in a state where a predetermined voltage is applied.

FIG. 31 is a graph showing transmission characteristics (T-V characteristics) of the MVA mode liquid crystal display device. The horizontal axis indicates applied voltage (V) to the liquid crystal layer 160, and the vertical axis indicates transmission factor (%) of light. A curved line A expressed by a solid line in the graph indicates a T-V characteristic in a direction vertical to a display screen (hereinafter referred to as "front direction"), and a curved line B expressed by a solid line plotted by Δ marks indicates a T-V characteristic in a direction of an azimuth angle of 90° and a polar angle of 60° (hereinafter referred to as "oblique direction"). Here, the azimuth angle is an angle measured in the counterclockwise direction from almost the center of the display screen on the basis of the horizontal direction. The polar angle is an angle with respect to the vertical line drawn at the center of the display screen. The display mode of the liquid crystal display device is a normally black mode in which an applied voltage to the liquid crystal layer 160 is lowered to display black, and an applied voltage is raised to display white. It is desirable that the T-V characteristics are constant independent of the viewing angle.

However, as shown in FIG. 31, the curved line A indicating the T-V characteristic in the front direction intersects the curved line B indicating the T-V characteristic at a point in the vicinity of an applied voltage of about 2.7 V. The transmission factor in the oblique direction is higher than the transmission factor in the front direction at an applied voltage of 2.7 V or less, and is lower than the transmission factor in the front direction at an applied voltage of 2.7 V or higher. Thus, in the range of the applied voltage of from 1.5 V to 2.7 V, since the transmission factor in the oblique direction is higher than that in the front direction, there arises a problem that when viewed in the oblique direction, the display image is seen to be whitish. Besides, since the transmission factor in the oblique direction is lower than the transmission factor in the front direction in the range of a relatively high applied voltage, when viewed in the oblique direction, the contrast in the whole display screen is lowered.

The transmission factor is varied in accordance with the retardation (Δn·d) of the liquid crystal layer 160. When viewed in the oblique direction, since the substantial retardation of the liquid crystal layer 160 is lessened by the liquid crystal molecules 312 inclined in the oblique direction, the above problem arises. Besides, also with respect to chromaticity, since the weight of the transmission factor from each pixel is changed between a case where it is seen in the front direction and a case where it is seen in the oblique direction, there arises a problem that the chromaticity is changed.

FIG. 32 is a graph showing the T-V characteristics when the display screen of the MVA mode liquid crystal display device is observed at plural viewing angles. The horizontal axis indicates the applied voltage (V) to the liquid crystal layer 160, and the vertical axis indicates the transmission factor (%) of light. A curved line A in the graph indicates the T-V characteristic in the front direction. Curved lines B, C, D and E indicate the T-V characteristics in the directions of an azimuth angle of 90° and polar angles of 20°, 40°, 60° and 80°, respectively. As shown in FIG. 32, an undulation occurs on the curved line E in a region F, and there is a range in which even if the applied voltage is raised, the transmission factor is lowered. Thus, there arises a problem that a display image is reversed between the front direction and the direction of a polar angle of 80°.

SUMMARY OF THE INVENTION

An object of the present invention is to provide a liquid crystal display device in which excellent viewing angle characteristics can be obtained, and a driving method thereof.

The above object is achieved by a driving method of a liquid crystal display device characterized in that a driving voltage is applied to a liquid crystal of a pixel only in a predetermined time in one frame period, and an application time of the driving voltage is changed to cause the pixel to display a predetermined gradation.

BRIEF DESCRIPTION OF THE DRAWINGS

FIG. 3 is a graph showing the time change of transmission factor of the liquid crystal display device according to the first embodiment of the invention;

DESCRIPTION OF THE PREFERRED EMBODIMENTS

First Embodiment

Figure 1:
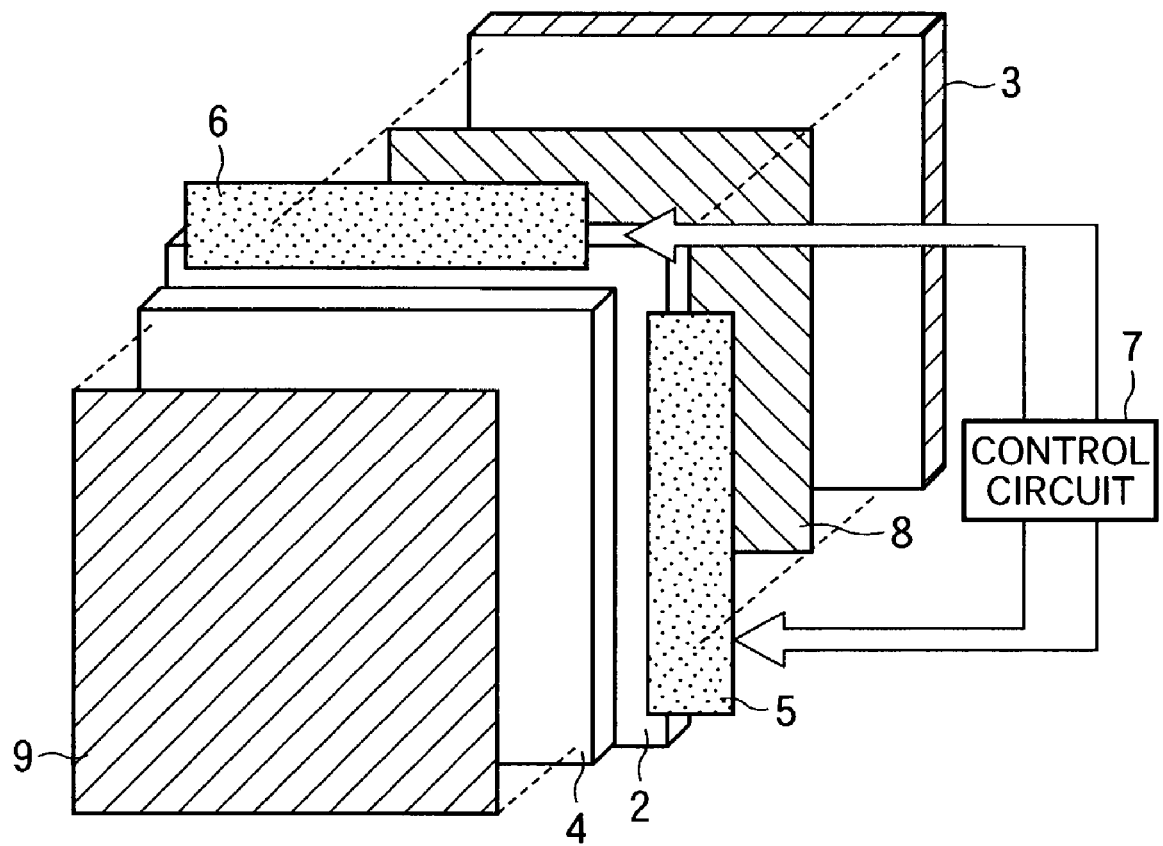
FIG. 1 is a view showing a schematic construction of a liquid crystal display device according to a first embodiment of the present invention.

A liquid crystal display device according to a first embodiment of the present invention and a driving method thereof will be described with reference to FIGS. 1 to 15. FIG. 1 shows a schematic construction of the liquid crystal display device according to this embodiment. The liquid crystal display device has such a construction that a TFT substrate 2 on which a thin film transistor (TFT) and the like are formed and an opposite substrate 4 on which a color filter (CF) and the like are formed are made to face each other and are bonded, and a liquid crystal is sealed between the substrates 2 and 4.

Gate bus line driving circuits 5 and a data bus line driving circuits 6, on each of which a driver IC for driving plural bus lines are mounted, are provided on the TFT substrate 2. These driving circuits 5 and 6 output a scanning signal and a data signal to a predetermined gate bus line or drain bus line on the basis of a predetermined signal outputted from a control circuit 7. A polarizing plate 8 is disposed on a substrate surface of the TFT substrate 2 opposite to its element formation surface, and a back light unit 3 is attached to a surface opposite to the TFT substrate 2 of the polarizing plate 8. On the other hand, a polarizing plate 9 disposed in crossed Nicols with respect to the polarizing plate 8 is bonded to a surface opposite to the CF formation surface of the opposite substrate 4.

Figure 2A:
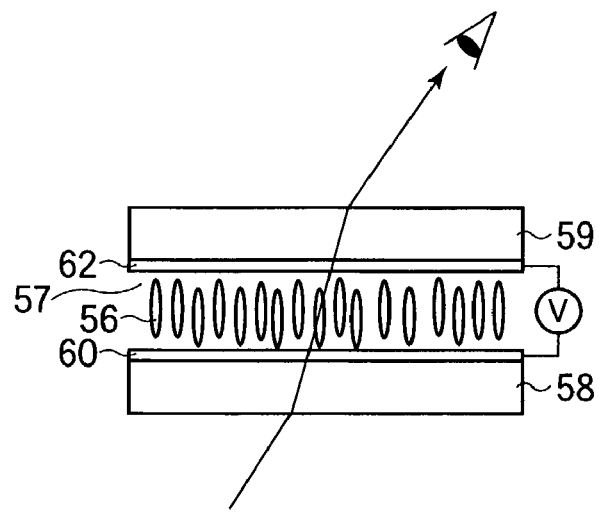
FIGS. 2A to 2C are views for explaining viewing angle characteristics of the liquid crystal display device according to the alignment state of liquid crystal molecules.
Figure 2B:
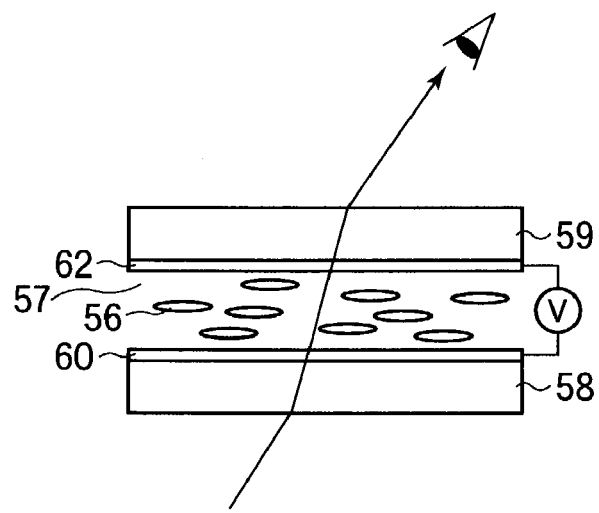
Figure 2C:
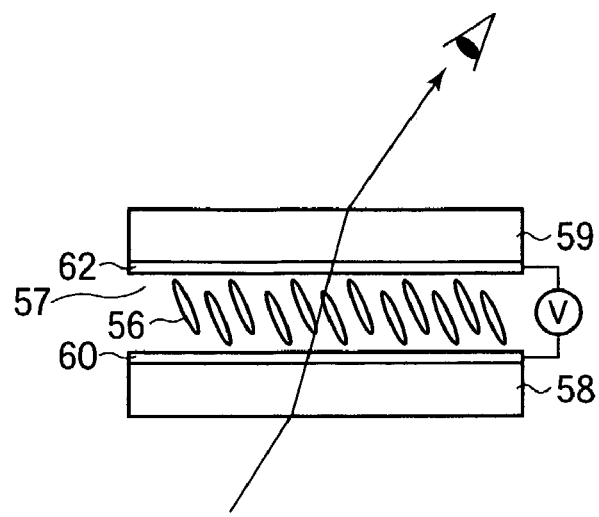

In this embodiment, a liquid crystal display device of a normally black mode is used in which a liquid crystal having a negative dielectric anisotropy and vertically aligned at the time of no voltage application is sealed. The change of viewing angle characteristics according to the alignment state of liquid crystal molecules will be described with reference to FIGS. 2A to 2C. FIG. 2A shows the alignment state of the liquid crystal molecules when black is displayed, and FIG. 2B shows the alignment state of the liquid crystal molecules when white is displayed. FIG. 2C shows the alignment state of the liquid crystal molecules when a half tone is displayed. As shown in FIG. 2A, in a state where a voltage is not applied between a pixel electrode 60 formed on a glass substrate 58 and a common electrode 62 formed on a glass substrate 59, liquid crystal molecules 56 are aligned almost vertically to the substrate surface. In this state, when viewed in the front direction, since the retardation occurring in the liquid crystal layer 57 becomes approximately zero, black is displayed. Besides, also when viewed in the oblique direction, as shown in FIG. 31, a black display having substantially the same transmission factor as that in the front direction is obtained.

As shown in FIG. 2B, in a state where a predetermined voltage is applied between the pixel electrode 60 and the common electrode 62, and the liquid crystal molecules 56 are aligned parallel to the substrate surface, when viewed in the front direction, since the retardation occurring in the liquid crystal layer 57 becomes approximately λ/2, white is displayed. Besides, when viewed in the oblique direction, the transmission factor becomes slightly lower than that in the front direction, and a gray display is produced (see FIG. 31).

Besides, as shown in FIG. 2C, in the state where the liquid crystal molecules 56 are inclined at a predetermined angle with respect to the substrate surface and are aligned, the retardation of the liquid crystal layer 57 is changed in the range of from 0 to λ/2, and a half tone is displayed. However, although this half tone display becomes appropriate when viewed in the front direction, when viewed in the oblique direction, since the retardation of the liquid crystal layer 57 is changed in accordance with the viewing angle, a desired gradation can not be obtained. For example, when viewed in the oblique direction as shown in FIG. 2C, although gray should be originally displayed, a whitish display is produced.

Figure 31:
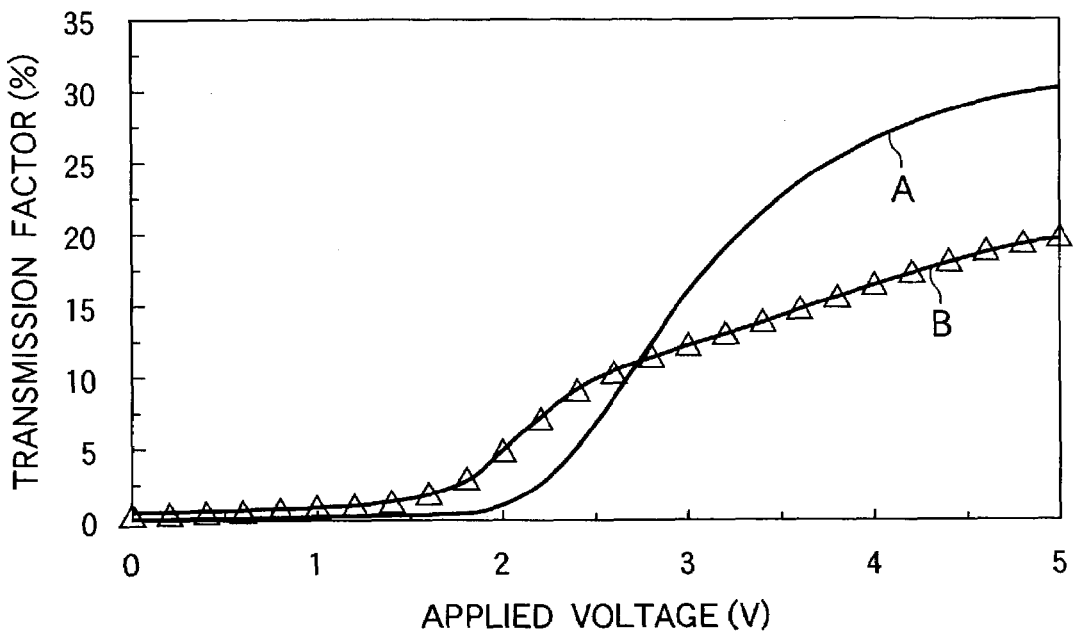
FIG. 31 is a graph showing T-V characteristics of the conventional MVA mode liquid crystal display device.

In the T-V characteristics shown in FIG. 31, as already described, in the half tone display in the range in which the applied voltage is from 1.5 V to 2.7 V, since the transmission factor in the oblique direction is higher than that in the front direction, the display image is seen to be whitish. For example, in FIG. 31, in the case where a voltage of 2 V is applied to obtain a transmission factor of 1% when viewed in the front direction, the transmission factor in the oblique direction is approximately 5 times as high as that. As stated above, in the half tone display in the range where the applied voltage is from 1.5 V to 2.7 V, the retardation of the liquid crystal layer 57 is greatly changed in dependence on the viewing angle, and consequently, the displayed half tone is greatly changed in accordance with the viewing angle.

On the other hand, in the case where a white image is displayed, that is, as shown in FIG. 31, in the case where a maximum gradation voltage of 5 V is applied to the liquid crystal layer 57 and a transmission factor of 30% when viewed in the front direction is obtained, a transmission factor approximately ⅔ as high as that can be obtained in the oblique direction. In this case, only the contrast is somewhat lowered, and a whitish image does not occur. Further, as shown in FIG. 31, in the case where a black image is displayed, variation in transmission factor due to the viewing angle becomes less. In this embodiment, attention is paid to this point, and a driving method as shown in FIG. 3 is adopted.

FIG. 3 is a graph showing the time changes of an applied voltage to the liquid crystal layer 57 of the liquid crystal display device of the normally black mode according to this embodiment and a transmission factor. The graph (a) in the upper part of FIG. 3 shows the time change of the applied voltage to the liquid crystal layer 57 in a pixel, and the graph (b) in the lower part shows the time change of the transmission factor of the pixel. Both the graphs (a) and (b) are expressed by a common horizontal axis (time axis: msec). The vertical axis of the upper graph (a) indicates the applied voltage (V), and the vertical axis of the lower graph (b) indicates the transmission factor (%) of light. As shown in the graph (a), the period of a frame $f_n$ is 16.7 msec (1/60 sec), and the liquid crystal layer is driven by a frame reversal driving system in which the polarity of a gradation voltage is reversed for each frame $f_n$. A gradation voltage P applied to the pixel is continuously kept at an on level of +5.0 V in, for example, first 50% period (1/120 sec) of the positive polarity frame $f_n$. Next, the gradation voltage P comes to have an off level, and is kept at a common potential (for example, 0 V) in the remaining 50% period (1/120 sec).

In a next frame $f_{n+1}$, the gradation voltage P applied to the pixel comes to have the on level, and is continuously kept at a negative polarity voltage level of −5.0 V in the first 50% period (1/120 sec). Next, the gradation voltage P comes to have the off level in the remaining 50% period (1/120 sec) and is kept at the common potential. In this example, the gradation voltage P has the on level only in the period of 50% (duty ratio 50%) of one frame period. By changing the duty ratio, plural gradations can be displayed. As stated above, in the driving method of the liquid crystal display device according to this embodiment, the driving voltage is applied to the liquid crystal of the pixel only in the predetermined time in one frame period, and the application time of the driving voltage is changed to cause the pixel to display a predetermined gradation. Not only the application time of the driving voltage, but also the voltage level of the driving voltage may be changed.

A curved line C in the lower graph (b) of FIG. 3 indicates the transmission factor in the front direction, and a curved line D indicates the transmission factor in the oblique direction. As shown in the graph (b), the transmission factors of light in the front direction and the oblique direction are changed in accordance with the gradation voltage P. When the gradation voltage P is at the on level (±5.0 V), as indicated by the curved line C and the curved line D, the transmission factor in the front direction is larger than the transmission factor in the oblique direction. When the gradation voltage P is at the off level (0 V), although there is a portion in which the transmission factor in the oblique direction is larger than the transmission factor in the front direction, an average transmission factor in the whole period of one frame $f_n$ in the front direction becomes larger than that in the oblique direction. By this, it is possible to prevent a whitish image which occurs when the transmission factor in the oblique direction becomes larger than the transmission factor in the front direction. Accordingly, when the magnitude of the gradation voltage P applied to each pixel is made the maximum gradation voltage (for example, ±5 V) as described above, and the duty ratio at which the gradation voltage P is applied is changed, a whitish display is suppressed and it becomes possible to carry out the gradation display in each pixel.

Besides, when the gradation is set by using the magnitude of the gradation voltage P at the on level and the duty ratio as parameters, the ratio of the transmission factor in the front direction to that in the oblique direction at an arbitrary applied voltage shown in FIG. 31 can be applied. Accordingly, by optimizing the magnitude of the gradation voltage P at the on level and the duty ratio in view of the transmission factor characteristics and the response characteristics, excellent viewing angle characteristics can be obtained over all the gradations. For example, the voltage applied to the liquid crystal layer 57 is made a voltage by which the vertical alignment state and the parallel alignment state excellent in the viewing angle characteristics are obtained, and on the basis of the transmission factor characteristics corresponding to those alignment states, the application time of the voltage is changed and the gradation image is displayed, so that excellent viewing angle characteristics can be obtained even in the half tone display.

Besides, this embodiment has a function to suppress chromaticity change due to gradations when viewed in the front direction and in the oblique direction. In the example shown in the lower graph (b) of FIG. 3, as stated above, the optical characteristic (retardation) when a voltage of 5.0 V is applied is reflected in all gradation displays. Accordingly, since chromaticity corresponding to the retardation occurring in the liquid crystal layer 57 when the voltage of 5.0 V is applied becomes dominant in all the gradations, the chromaticity change due to the gradation is greatly lessened, and excellent display characteristics can be obtained. Besides, when each gradation is set by using the magnitude of the applied voltage and the application time of the voltage as parameters, chromaticity corresponding to an arbitrary retardation can be applied. Accordingly, by selecting the magnitude of the voltage and the application time of the voltage in view of the transmission factor characteristics and the response characteristics, excellent viewing angle characteristics can be obtained in which the chromaticity change due to the gradation is small even when viewed in the oblique direction.

In order to decrease the contribution of optical characteristics in the process where the inclination angle of the liquid crystal molecule 56 is changed, it is desirable to use a liquid crystal in which the transmission factor change caused by the change of applied voltage is steep, that is, a liquid crystal panel excellent in optical responsiveness. Accordingly, when this embodiment is applied to a liquid crystal display panel excellent in high speed responsiveness, more excellent gradation viewing angle characteristics can be obtained. For similar reasons, when a voltage or a voltage range in which a liquid crystal can respond at high speed is used for a driving voltage range, more superior gradation viewing angle characteristics can be obtained.

Hereinafter, the liquid crystal display device according to this embodiment and the driving method thereof will be described in more specifically by use of examples 1-1 and 1-2.

EXAMPLE 1-1

Figure 27A:
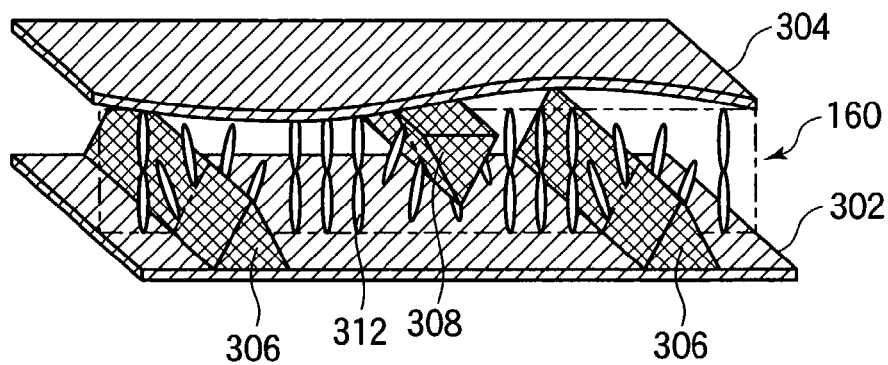
FIGS. 27A and 27B are sectional views showing the construction of a conventional MVA mode liquid crystal display device.
Figure 27B:
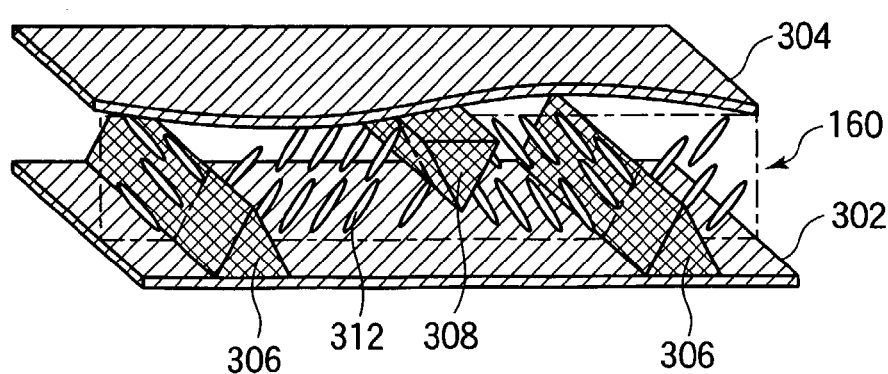
Figure 28:
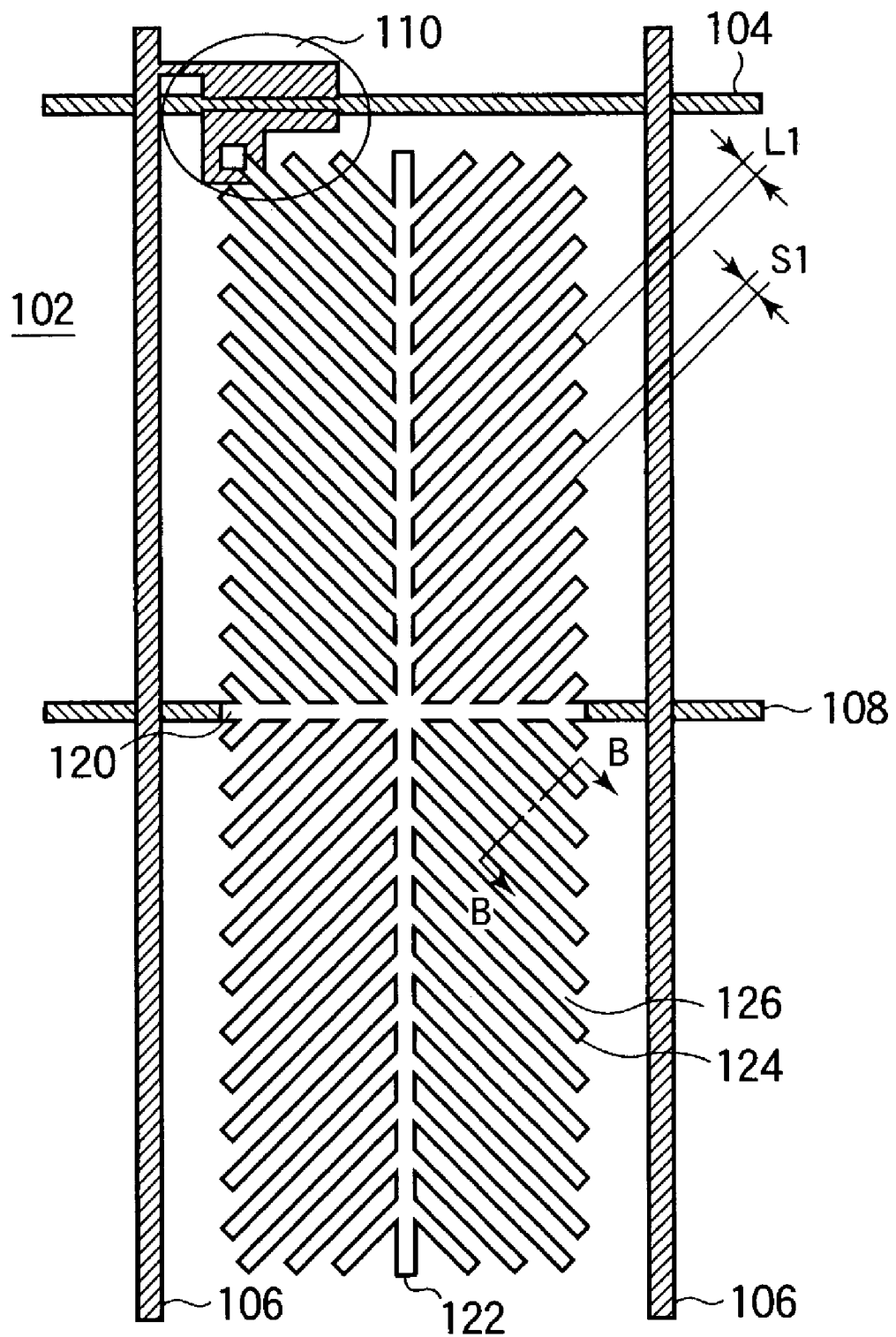
FIG. 28 is a view showing the construction of a conventional MVA mode liquid crystal display device.
Figure 29:
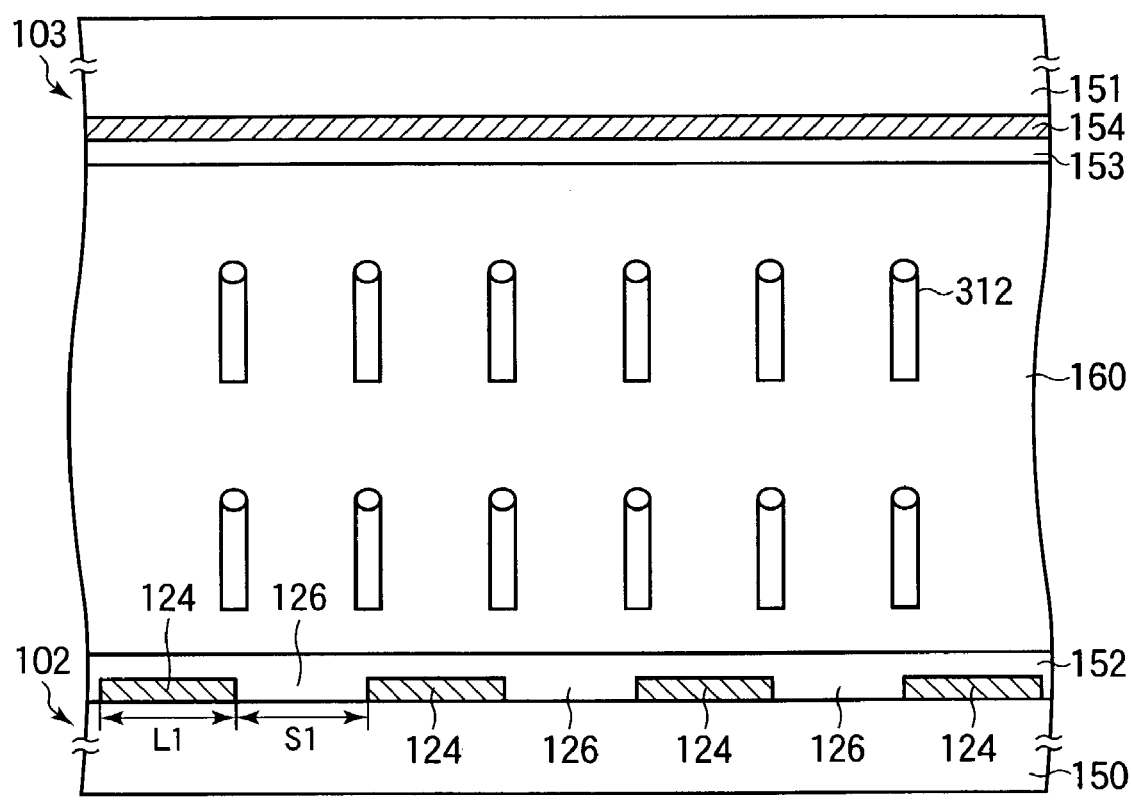
FIG. 29 is a sectional view showing the construction of the conventional MVA mode liquid crystal display device.
Figure 30:
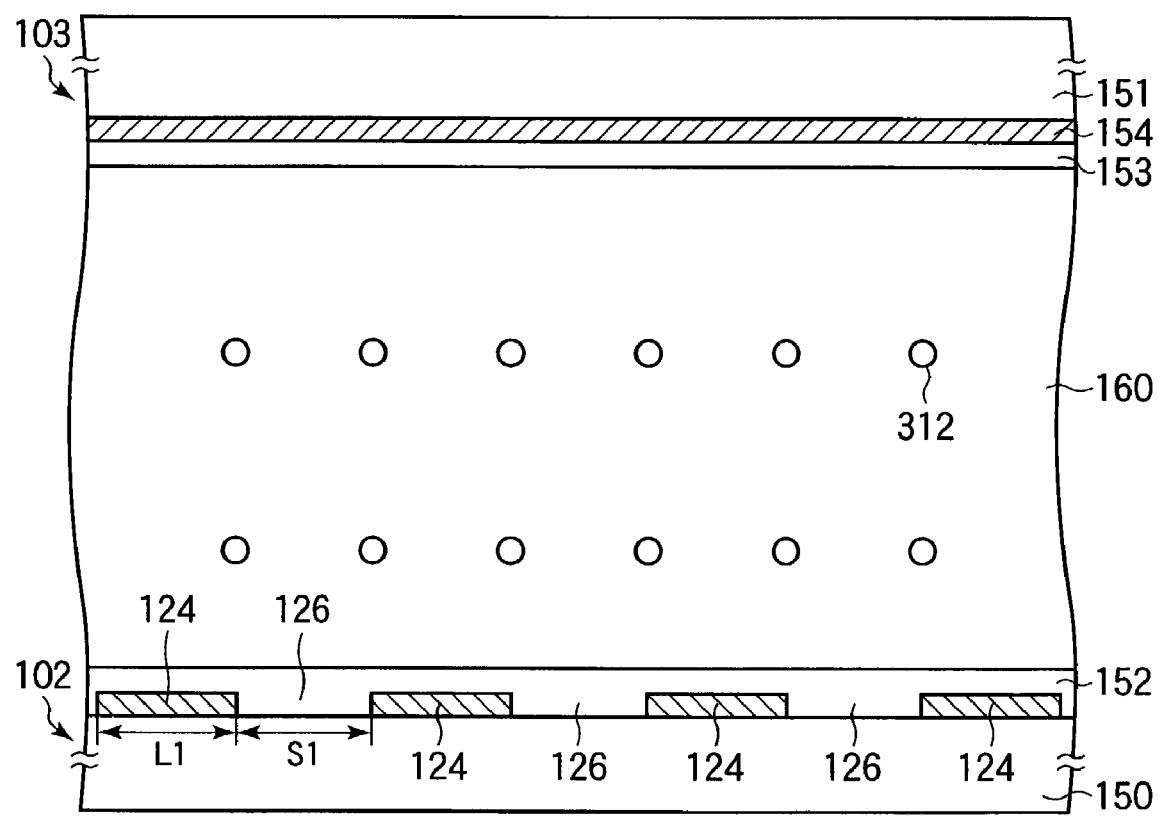
FIG. 30 is a sectional view showing the construction of the conventional MVA mode liquid crystal display device.

A liquid crystal display device according to example 1-1 of this embodiment and a driving method thereof will be described with reference to FIGS. 4 and 5. First, the liquid crystal display device used for this example will be described with reference to FIGS. 1, 27A and 27B. Plural slits each having a width of 10 μm are formed to be parallel to each other at intervals of 70 μm on the TFT substrate 2. Plural linear protrusions each having a height of 1.2 μm, a width of 10 μm and insulating properties are formed to be parallel to each other at intervals of 70 μm on the opposite substrate 4. Vertical alignment films (for example, made by JSR Corporation) are coated on both the substrates 2 and 4, spherical spacers each having a diameter of 3.0 μm are scattered and both the substrates 2 and 4 are bonded so that alignment regulating structures are alternately disposed. A liquid crystal (for example, made by Merck Ltd.) having a negative dielectric anisotropy is sealed between the substrates 2 and 4.

Next, the driving method of the liquid crystal display device according to this example will be described. In the above liquid crystal display device, a gradation display of each pixel is performed by changing a duty ratio for each pixel at a frame reversal frequency of 30 Hz (frame period 1/60 sec). The liquid crystal molecules 56 of the liquid crystal display device according to this example are aligned almost vertically to the substrate surface in the state of no voltage application, and is aligned almost parallel to the substrate surface in the state where a voltage of ±5.0 V is applied.

Figure 4:
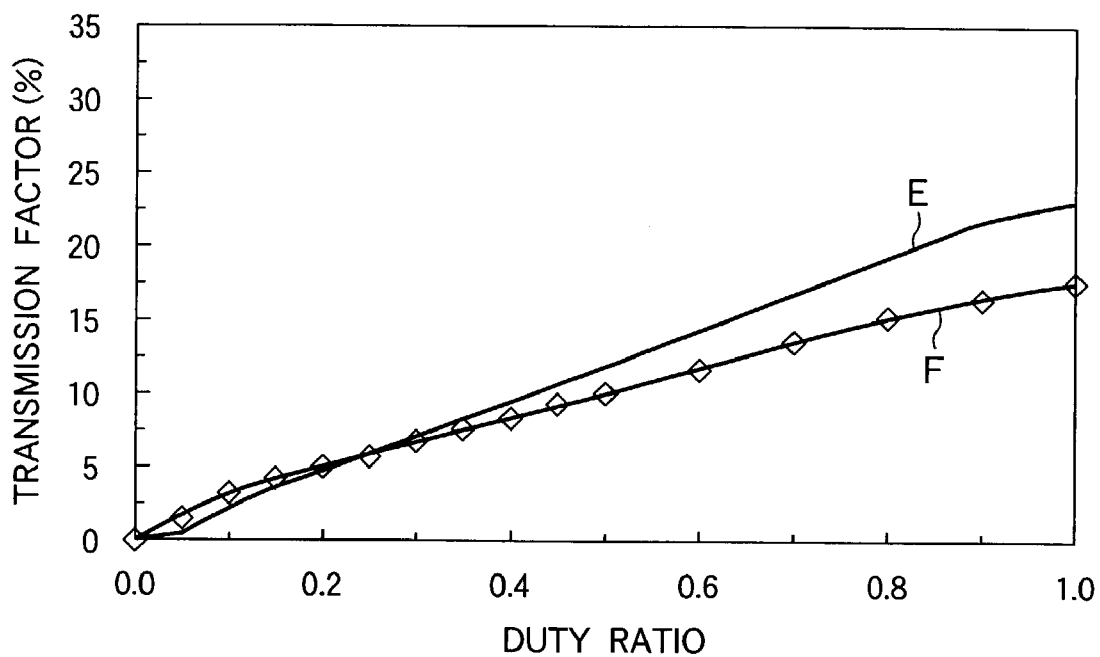
FIG. 4 is a graph showing the change of transmission factor with respect to the change of a duty ratio of a liquid crystal display device according to example 1-1 of the first embodiment of the invention.

FIG. 4 is a graph showing the change of a transmission factor with respect to the change of a duty ratio in the case where the driving method of the liquid crystal display device according to this example is used. The horizontal axis indicates the duty ratio of the gradation voltage P applied to the liquid crystal layer 57, and the vertical axis indicates the transmission factor (%) of light. A curved line E expressed by a solid line in the graph indicates the transmission factor in the front direction, and a curved line F expressed by a solid line plotted by ◇ marks indicates the transmission factor in the oblique direction. As shown in FIG. 4, according to this example, a difference between the transmission factor in the front direction and the transmission factor in the oblique direction becomes very small as compared with the case where the conventional driving method of the liquid crystal display device is used as shown in FIG. 31, and excellent gradation viewing angle characteristics are obtained.

Figure 5:
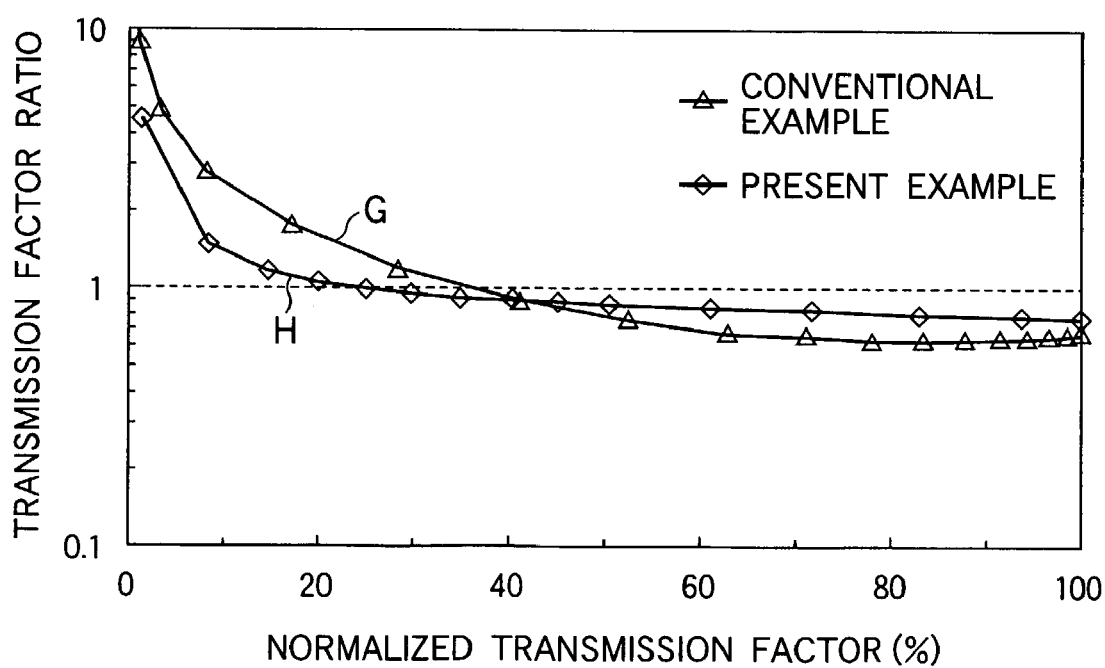
FIG. 5 is a graph showing an effect of the liquid crystal display device according to the example 1-1 of the first embodiment of the invention.

FIG. 5 is a graph showing display characteristics in the case where the driving method of the liquid crystal display device according to this example is used and those in the conventional case. The horizontal axis indicates normalized transmission factor. With respect to the conventional driving method, the respective transmission factors are normalized by a transmission factor at the time when a gradation voltage is 5.0 V. With respect to the driving method of this example, the respective transmission factors are normalized by a transmission factor at the time when a gradation voltage of 5.0 V is applied to the whole of one frame. The vertical axis indicates the logarithm of the ratio (transmission factor ratio) of the transmission factor in the oblique direction to the transmission factor in the front direction. A curved line G expressed by a solid line plotted by Δ marks indicates the transmission factor ratio in the case where the driving method of the conventional liquid crystal display device is used, and a curved line H expressed by a solid line plotted by ◇ marks indicates the transmission factor ratio of the case where the driving method of the liquid crystal display device according to this example is used. In the graph shown in FIG. 5, when the transmission factor ratio is constant independent of the normalized transmission factor, that is, the profile is flat, gradation viewing angle characteristics are superior. Besides, when the transmission factor ratio is close to 1.0, the gradation viewing angle characteristics are more superior. As shown in FIG. 5, according to this example, the transmission factor ratio at a low transmission factor, which is conventionally high, is lowered and the profile is flatter, and further, the transmission factor ratio is close to 1.0 on the whole. Accordingly, it is understood that superior gradation viewing angle characteristics can be obtained as compared with the conventional example.

According to this example, the chromaticity change due to gradation is also greatly improved. For example, with respect to white chromaticity, although a chromaticity shift of about 0.04 occurs conventionally in an x-y chromaticity diagram, a chromaticity shift in this example can be suppressed to be less than 0.01. Besides, also with respect to the chromaticity change of single color of red (R), green (G) and blue (B), which is difficult to improve, a similar effect can be obtained.

In this embodiment, although the MVA mode liquid crystal display device has been taken as an example, the gradation viewing angle characteristics can be similarly improved in a liquid crystal display device of another mode. For example, also in the liquid crystal display device of homogeneous orientation in which a liquid crystal having a positive dielectric anisotropy is sealed, excellent viewing angle characteristics can be obtained by applying this embodiment.

EXAMPLE 1-2

Figure 6A:
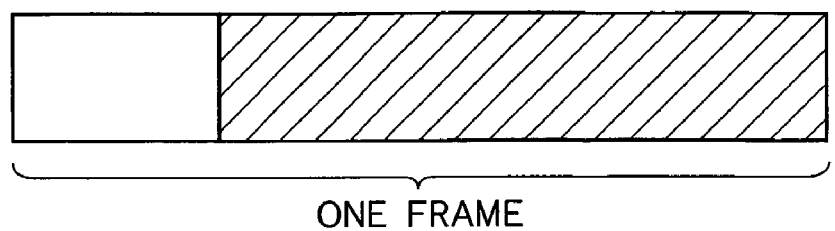
FIGS. 6A and 6B are conceptual views showing a driving method of a liquid crystal display device according to example 1-2 of the first embodiment of the invention.
Figure 6B:
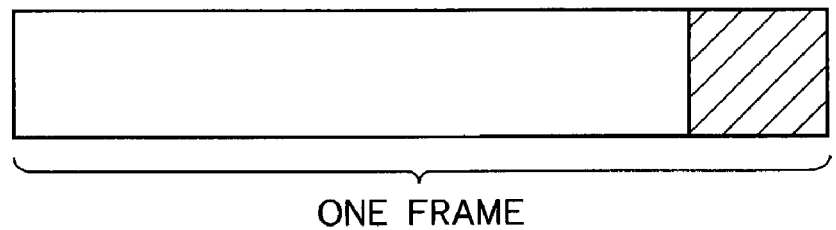

Next, a liquid crystal display device according to example 1-2 of this embodiment and a driving method thereof will be described with reference to FIGS. 6A to 15. FIGS. 6A and 6B are conceptual views showing the driving method of the liquid crystal display device according to this example. FIG. 6A shows a driving state in a case where gray close to black is displayed, and FIG. 6B shows a driving state in a case where gray close to white is displayed. In FIGS. 6A and 6B, the horizontal direction indicates a time of one frame. As shown in FIG. 6A, in the case where gray close to black is displayed, for example, white is displayed in a ¼ period of one frame period (duty ratio 25%), and black is displayed in the remaining period. Besides, as shown in FIG. 6B, in the case where gray close to white is displayed, for example, white is displayed in a ⅚ period of one frame period (duty ratio 83%), and black is displayed in the remaining period. As stated above, in this example, only the black display and the white display are used, and a time when white is displayed is changed in one frame period, so that a half tone display is realized by time division (duty ratio).

For example, in a PDP (Plasma Display Panel), 64 gradations are realized by combining plural subfields (for example, 1, 2, 4, 8, 16, 32) in which relative ratios of luminance are different. However, in the liquid crystal display device, when the response characteristics of a liquid crystal and the response characteristics of a TFT are considered, it is very difficult to adopt the method used for the PDP. On the other hand, when this example is adopted, a multi-gradation display by time division can be easily realized using a normal liquid crystal and TFT.

Figure 7:
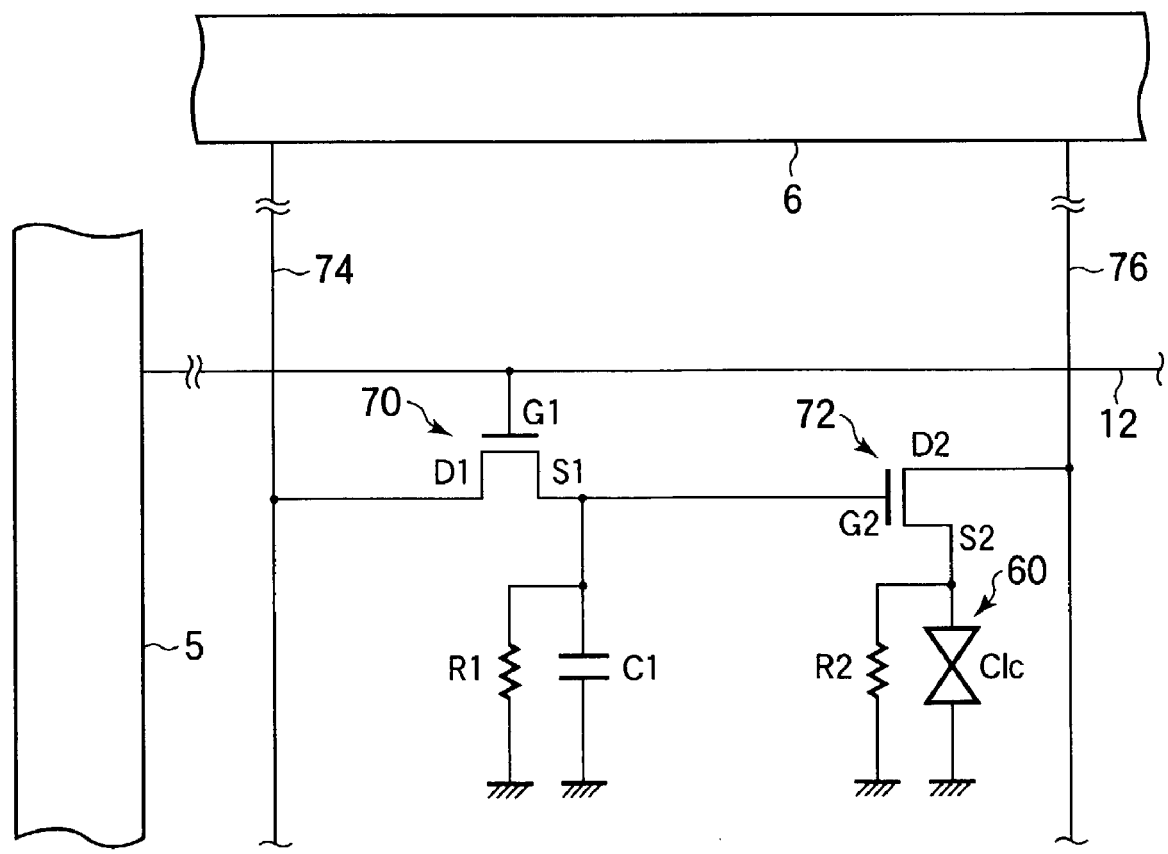
FIG. 7 is a view showing an equivalent circuit of the liquid crystal display device according to the example 1-2 of the first embodiment of the invention.

Next, the driving method of the liquid crystal display device according to this example will be described. FIG. 7 shows an equivalent circuit of the liquid crystal display device according to this example for one pixel. As shown in FIG. 7, plural data bus lines 74 and plural driving voltage bus lines 76 are formed substantially parallel to each other in the vertical direction in the drawing (in FIG. 7, only one line is shown for the respective lines). Plural gate bus lines 12 are formed to intersect the data bus lines 74 and the driving voltage bus lines 76 at almost right angles through a not-shown insulating film (in FIG. 7, only one line is shown). The respective data bus lines 74 and the respective driving voltage bus lines 76 are driven by a data bus line driving circuit 6, and the respective gate bus lines 12 are driven by a gate bus line driving circuit 5.

Two TFTs 70 and 72 are formed in one pixel. A gate electrode G1 of the first TFT 70 is connected to the gate bus line 12. A drain electrode D1 of the TFT 70 is connected to the data bus line 74. A source electrode S1 of the TFT 70 is connected to one ends of a capacitance (first capacitance) C1 and a resistance (first resistance) R1 which are connected in parallel with each other, and is further connected to a gate electrode G2 of the second TFT 72. The other ends of the capacitance C1 and the resistance R1 are connected to a not-shown power source circuit. A drain electrode D2 of the TFT 72 is connected to the driving voltage bus line 76, and a source electrode S2 is connected to a pixel electrode 60. A liquid crystal capacitance (second capacitance) Clc is formed by the pixel electrode 60, a common electrode, and a liquid crystal sandwiched therebetween. Besides, a resistance (second resistance) R2 is formed of a liquid crystal layer. By this, the source electrode S2 of the TFT 72 is connected to one ends of the liquid crystal capacitance Clc and the resistance R2 which are connected in parallel with each other. The other ends of the liquid crystal capacitance Clc and the resistance R2 are kept at a common potential.

When a predetermined gate voltage is applied to the gate electrode G1 through the gate bus line 12, the TFT 70 is turned on. When the TFT 70 is turned on, a data voltage applied to the data bus line 74 is applied to the gate electrode G2 of the TFT 72, and a predetermined electric charge is charged to the capacitance C1. When the data voltage exceeding a threshold voltage is applied to the gate electrode G2 of the TFT 72, the TFT 72 is turned on, and a driving voltage from the bus line 76 is applied to the pixel electrode 60.

When the TFT 70 is turned off, a gate voltage Vg2 of the gate electrode G2 is lowered with the lapse of time in accordance with a time constant depending on the capacitance C1 and the resistance R1. When the gate voltage Vg2 becomes the threshold voltage or less, the TFT 72 is turned off. When the TFT 72 is turned off, the driving voltage applied to the pixel electrode 60 is lowered with the lapse of time in accordance with a time constant depending on the liquid crystal capacitance Clc and the resistance R2.

When the data voltage of a relatively high level is applied from the data bus line 74 through the TFT 70 to the capacitance C1, the resistance R1 and the gate electrode G2 of the TFT 72, since the TFT 72 keeps the on state for a relatively long time, the driving voltage is applied to the liquid crystal layer 57 for a long time, and a white display is realized.

When the data voltage of a relatively low level (threshold voltage of the TFT 72 or less) is applied from the data bus line 74 through the TFT 70 to the capacitance C1, the resistance R1 and the gate electrode G2 of the TFT 72, since the TFT 72 keeps the off state, the driving voltage is not applied to the liquid crystal layer 57, and a black display is realized.

When the data voltage of an intermediate level between the high level and the low level is applied from the data bus line 74 through the TFT 70 to the capacitance C1, the resistance R1 and the gate electrode G2 of the TFT 72, after the TFT 70 is turned off, the TFT 72 keeps the on state for a time determined by the time constant depending on the capacitance C1 and the resistance R1. The driving voltage is applied to the liquid crystal layer 57 for the on time. By this, a half tone display is realized according to the ratio of the on time of the TFT 72 in one frame period.

Figure 8:
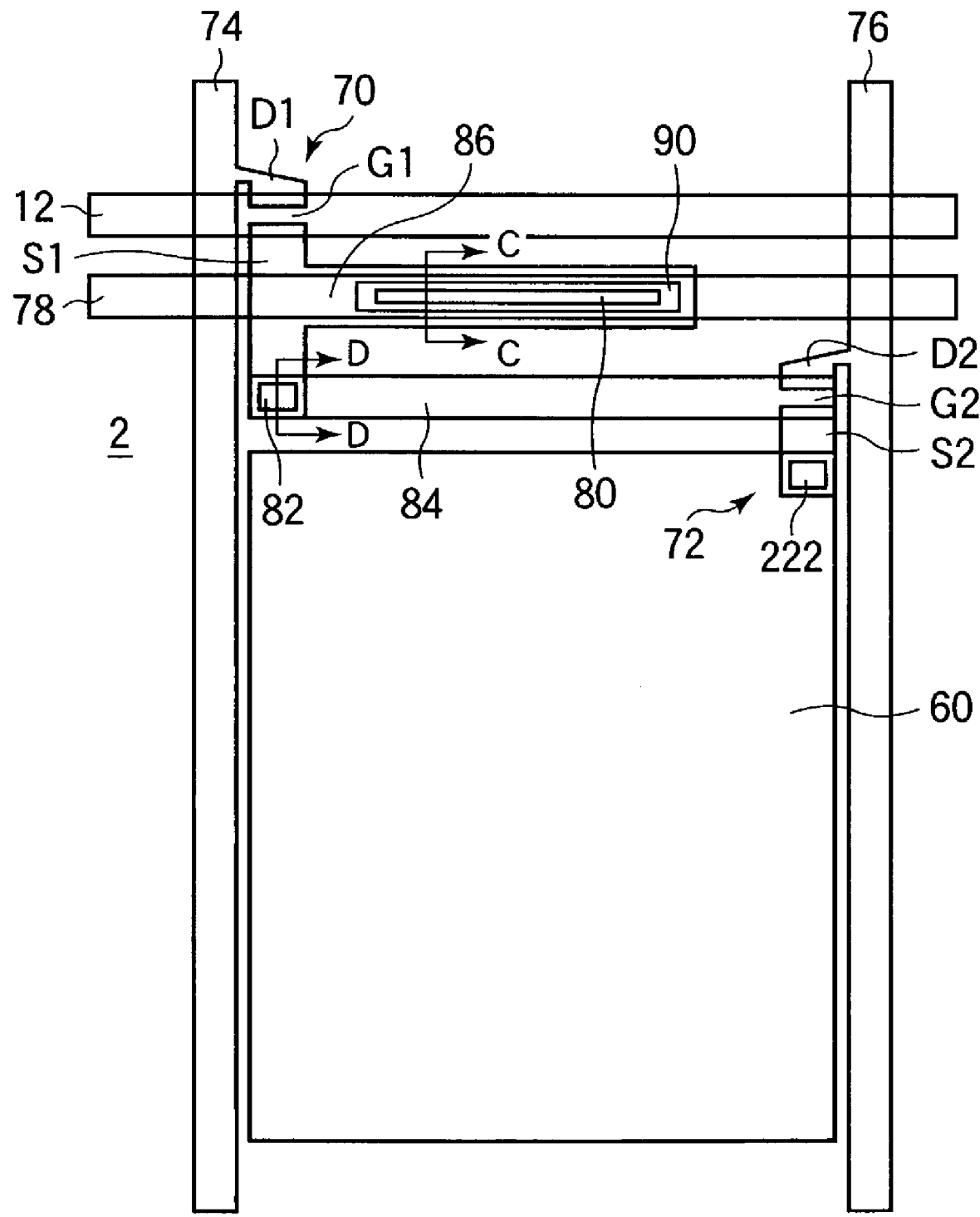
FIG. 8 is a view showing the construction of the liquid crystal display device according to the example 1-2 of the first embodiment of the invention.
Figure 9:
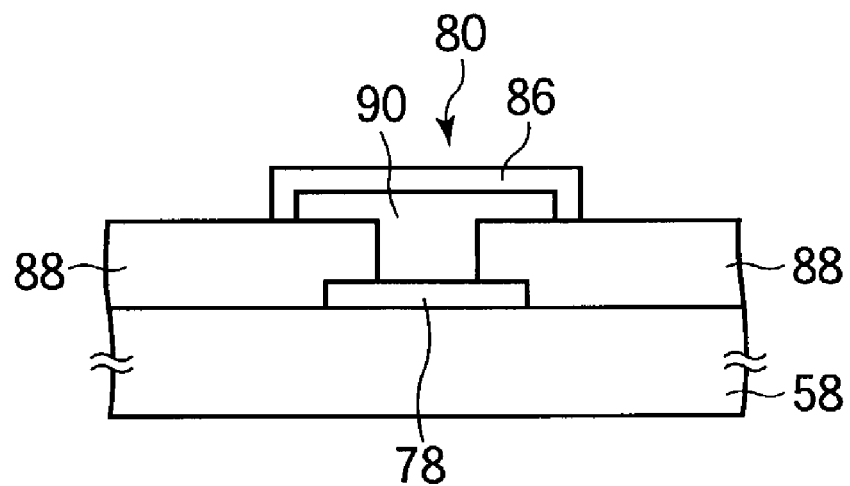
FIG. 9 is a sectional view showing the construction of the liquid crystal display device according to the example 1-2 of the first embodiment of the invention.
Figure 10:
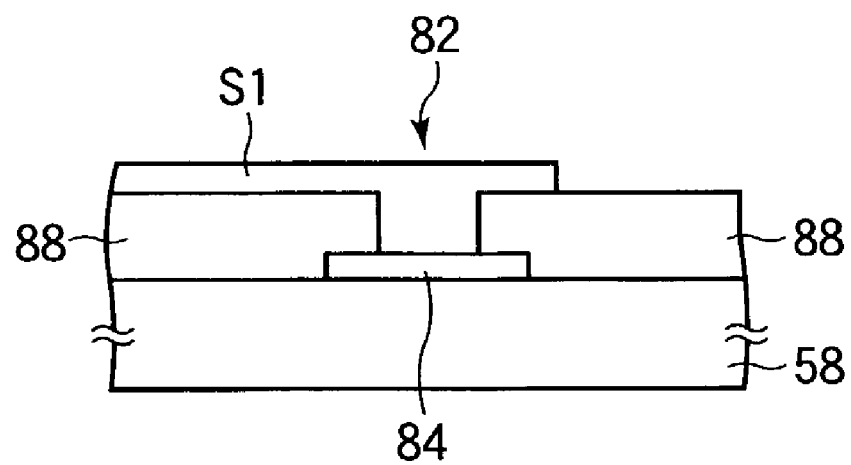
FIG. 10 is a sectional view showing the construction of the liquid crystal display device according to the example 1-2 of the first embodiment of the invention.
Figure 11:
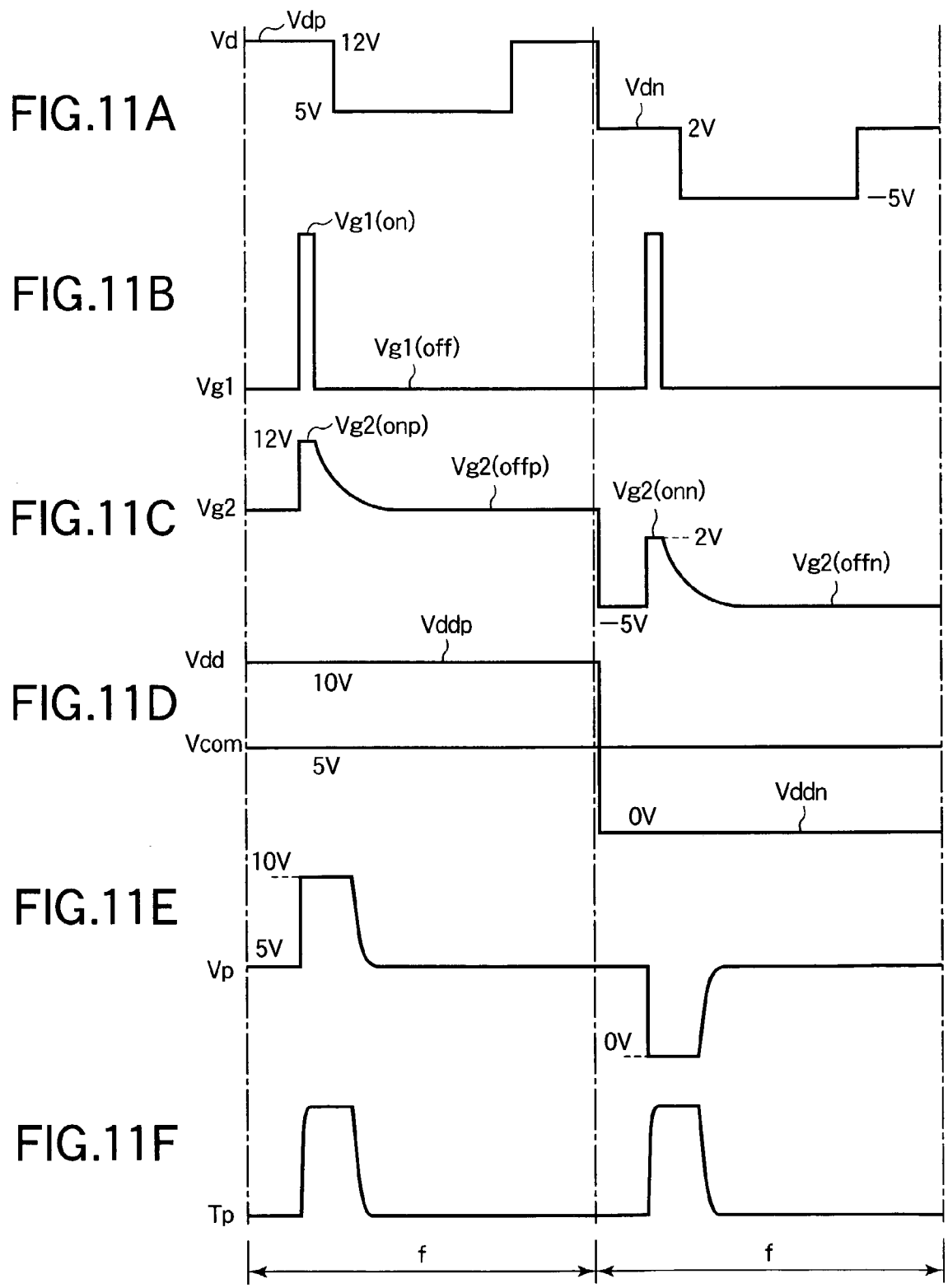
FIGS. 11A to 11F are views showing driving waveforms of the liquid crystal display device according to the example 1-2 of the first embodiment of the invention.

FIG. 8 shows the construction of one pixel of the liquid crystal display device according to this example. FIG. 9 is a sectional view taken along line C-C of FIG. 8, and FIG. 10 is a sectional view taken along line D-D of FIG. 8. As shown in FIGS. 8 to 10, the gate bus line 12 extending in the horizontal direction and a common bus line 78 extending substantially parallel to the gate bus line 12 are disposed to have a predetermined interval therebetween and to be adjacent to each other and is formed of the same formation material on the TFT substrate 2. The data bus line 74 and the driving voltage bus line 76 are formed at both sides of a pixel region to intersect the gate bus line 12 and the common bus line 78 at almost right angles through an insulating film. The data bus line 74 and the driving voltage bus line 76 are formed of the same formation material.

The TFT 70 is formed in the vicinity of an intersection position of the gate bus line 12 and the data bus line 74. The drain electrode D1 of the TFT 70 is connected to the data bus line 74. The source electrode S1 is connected to a connection wiring line 84 formed substantially parallel to the common bus line 78 through a contact hole 82. A source wiring line 86 substantially parallel to the common bus line 78 extends from the source electrode S1. The source wiring line 86 is connected to the common bus line 78 through a dielectric 90 formed on a contact hole 80 and having a relatively small resistance value. A resist or ultraviolet curing resin is used for a formation material of the dielectric 90. The connection wiring line 84 is connected to the gate electrode G2 of the TFT 72. The drain electrode D2 of the TFT 72 is connected to the driving voltage bus line 76, and the source electrode S2 is connected to the pixel electrode 60 through a contact hole 222. In this example, the dielectric 90 functions as the resistance R1 and the dielectric of the capacitance C1. Besides, the liquid crystal layer 57 functions as the resistance R2.

Next, the driving method of the liquid crystal display device according to this example will be described on the basis of specific examples. FIGS. 11A to 11F show driving waveforms of two frames of the liquid crystal display device according to this example. FIG. 11A shows a waveform of a data voltage Vd applied to the data bus line 74, and FIG. 11B shows a waveform of a gate voltage Vg1 applied to the gate electrode G1 of the TFT 70. FIG. 11C shows a waveform of a gate voltage Vg2 applied to the gate electrode G2 of the TFT 72, and FIG. 11D shows waveforms of a liquid crystal driving voltage Vdd applied to the driving voltage bus line 76 and a common voltage Vcom. Besides, FIG. 11E shows a waveform of a gradation voltage Vp applied to the pixel electrode 60, and FIG. 11F shows, for example, a waveform of display luminance Tp in the front direction of a pixel. The horizontal direction in the drawing indicates a time. The vertical direction of FIGS. 11A to 11E indicates a voltage level, and the vertical direction of FIG. 11F indicates a luminance level.

In this example, as shown in FIG. 11D, the common voltage is Vcom=+5 V. Then, a positive polarity driving voltage Vddp=+10 V and a reverse polarity driving voltage Vddn=0 V are alternately outputted for each frame f to the driving voltage bus line 76. By this, the liquid crystal layer 57 is subjected to frame reversal driving with the driving voltage of ±5 V. Hereinafter, a frame period in which the positive polarity driving voltage Vddp is applied to the driving voltage bus line 76 is called a positive polarity frame period, and a frame period in which the reverse polarity driving voltage Vddn is applied to the driving voltage bus line 76 is called a reverse polarity frame period.

The positive polarity driving voltage Vddp=+10 V is applied to the driving voltage bus line 76 in the positive polarity frame period. In order to certainly turn off the TFT 72 in this positive polarity frame period, it is necessary that the gate voltage Vg2 of the TFT 72 is made lower than the minimum value of the drain voltage (that is, the positive polarity driving voltage Vddp=+10 V) by about 5 V. Besides, in order to certainly turn on the TFT 72 in the positive polarity frame period, it is necessary that the gate voltage Vg2 of the TFT 72 is made higher than the maximum value of the drain voltage (that is, the positive polarity driving voltage Vddp=+10 V). Then, as shown in FIG. 11A, in the positive polarity frame period, a voltage between +5 V and +15 V (voltage width of 10 V) is applied as the data voltage Vdp applied to the data bus line 74.

The reverse polarity driving voltage Vddn=0 V is applied to the driving voltage bus line 76 in the reverse polarity frame period. In order to certainly turn off the TFT 72 in the reverse polarity frame period, it is necessary that the gate voltage Vg2 of the TFT 72 is made lower than the minimum value of the drain voltage (that is, the reverse polarity driving voltage Vddn=0 V) by about 5 V. Besides, in order to certainly turn on the TFT 72 in the reverse polarity frame period, it is necessary that the gate voltage Vg2 of the TFT 72 is made higher than the maximum value of the drain voltage (that is, the reverse polarity driving voltage Vddn=0 V). Then, as shown in FIG. 11A, in the reverse polarity frame period, a voltage between −5 V and +5 V (voltage width of 10 V) is applied as the data voltage Vdn applied to the data bus line 74.

Accordingly, as shown in FIG. 11A, the data voltage Vd is varied within a voltage width of 20 V from −5 V to +15 V. Thus, in order to certainly make the TFT 70 operate as a switching element, as shown in FIG. 11B, the gate voltage Vg1 applied to the gate bus line 12 is made the off time voltage Vg1 (off)=−10 V and the on time voltage Vg1 (on)=+20 V of TFT 70.

Next, a driving operation will be described in sequence.

(1) In the case of positive polarity frame period:

For example, it is assumed that the gradation voltage Vdp=+12 V is outputted to the data bus line 74 (see FIG. 11A). Next, the gate pulse Vg1 (on) is outputted to the gate bus line 12 and the TFT 70 is turned on. When the TFT 70 is in the on state, the data voltage Vdp is applied to the gate electrode G2 of the TFT 72, and the capacitance C1 is charged. The gate voltage Vg2 (onp) (=+12 V) is applied to the gate electrode G2 of the TFT 72 as shown in FIG. 1C, and the TFT 72 is turned on.

Next, when the gate voltage becomes Vg1 (off) and the TFT 70 is turned off, the electric charge of the capacitance C1 is discharged at a predetermined time constant, and as shown in FIG. 1C, the level of the voltage applied to the gate electrode G2 of the TFT 72 is gradually decreased. This voltage level gradually approaches the threshold voltage Vth of the TFT 72, then it becomes less than that, and finally becomes Vg2 (offp) (=Vcom=+5 V).

As stated above, the on time of the TFT 72 is determined by the magnitude of the data voltage Vdp supplied to the gate electrode G2 and the time constant of attenuation depending on the capacitance C1 and the resistance R1. In the on state of the TFT 72, the positive polarity driving voltage Vddp=+10 V shown in FIG. 11D is written in the pixel electrode 60 as the gradation voltage Vp, and the voltage level is kept during the on time of the TFT 72 (see FIG. 11E). In this period, as shown in FIG. 11F, the predetermined transmission factor Tp is obtained in the liquid crystal layer.

When the gate voltage Vg2 of the TFT 72 becomes the predetermined threshold voltage Vth or less, the TFT 72 is turned off, and the gradation voltage Vp is decreased to the common voltage Vcom at the time constant depending on the liquid crystal capacitance Clc and the liquid crystal resistance R2 (see FIG. 11E). By this, the transmission factor Tp of the liquid crystal layer is decreased as shown in FIG. 11F.

(2) In the case of reverse polarity frame period:

A description will be given of, as an example, a case where the same gradation is displayed subsequently to the foregoing positive polarity frame. First, the gate voltage Vg2 (offn) of the gate electrode G2 of the TFT 72 is kept at −5 V by a not-shown circuit through the capacitance C1 and the resistance R1.

Next, the reverse polarity gradation voltage Vdn=+2 V is outputted to the data bus line 74 (see FIG. 11A). Next, the gate pulse Vg1 (on) is outputted to the gate bus line 12 and the TFT 70 is turned on. While the TFT 70 is in the on state, the data voltage Vdn is applied to the gate electrode G2 of the TFT 72, and the capacitance C1 is charged. As shown in FIG. 11C, the gate voltage Vg2 (onn) (=+2 V) is applied to the gate electrode G2 of the TFT 72 and the TFT 72 is turned on.

Next, when the gate voltage becomes Vg1 (off) and the TFT 70 is turned off, the electric charge of the capacitance C1 is discharged at the predetermined time constant, and as shown in FIG. 1C, the level of the voltage applied to the gate electrode G2 of the TFT 72 is gradually decreased. This voltage level gradually approaches the threshold voltage Vth of the TFT 72, then it becomes less than that, and finally becomes Vg2 (offn) (=−5 V).

As stated above, the on time of the TFT 72 is determined by the magnitude of the data voltage Vdn supplied to the gate electrode G2 and the time constant of attenuation depending on the capacitance C1 and the resistance R1. In the on state of the TFT, the reverse polarity driving voltage Vddn=0 V shown in FIG. 11D is written in the pixel electrode 60 as the gradation voltage Vp, and the voltage level is kept during the on time of the TFT 72 (see FIG. 11E). In this period, as shown in FIG. 11F, the predetermined transmission factor Tp is obtained in the liquid crystal layer.

When the gate voltage Vg2 of the TFT 72 becomes the predetermined threshold voltage Vth or less, the TFT 72 is turned off, and the gradation voltage Vp is decreased to the common voltage Vcom at the time constant depending on the liquid crystal capacitance Clc and the liquid crystal resistance R2 (see FIG. 11E). By this, as shown in FIG. 11F, the transmission factor Tp of the liquid crystal layer is decreased.

As stated above, according to this example, the on time of the TFT 72 can be controlled in accordance with the magnitude of the data voltage Vd outputted to the data bus line 74. When the TFT 72 is in the on state, the driving voltage Vdd of +10 V or 0 V is applied to the liquid crystal layer 57, and in the off state, it becomes equal to the common voltage Vcom=+5

V. Thus, in accordance with the magnitude of the data voltage Vd, a time in which white is displayed in one frame can be controlled.

Accordingly, when the data voltage Vd is made maximum, the TFT 72 is kept in the on state in approximately one frame period and a white display can be obtained. On the other hand, when the data voltage Vd is made minimum, the TFT 72 is kept in the off state for approximately one period and a black display can be obtained.

By setting the data voltage to an arbitrary value between the maximum and the minimum, the TFT 72 is kept in the on state in an arbitrary time for one frame period, and then, it can be brought into the off state. By this, the half tone can be displayed. According to this example, an effect similar to the example 1-1 can be obtained by using the general liquid crystal material and the TFT construction.

Besides, in this example, since it is necessary that the voltage applied to the liquid crystal layer 57 is discharged and not kept, it is not necessary to use a liquid crystal having a high resistance value. Thus, a liquid crystal such as a cyano system one can be used, and the response speed of the liquid crystal display device can be enhanced. Further, since it is possible to use a chlorinated liquid crystal which has a large refractivity anisotropy An, but a small resistance value, a cell thickness d can be made thin. Thus, the liquid crystal display device with further high speed response can be realized.

Figure 12:
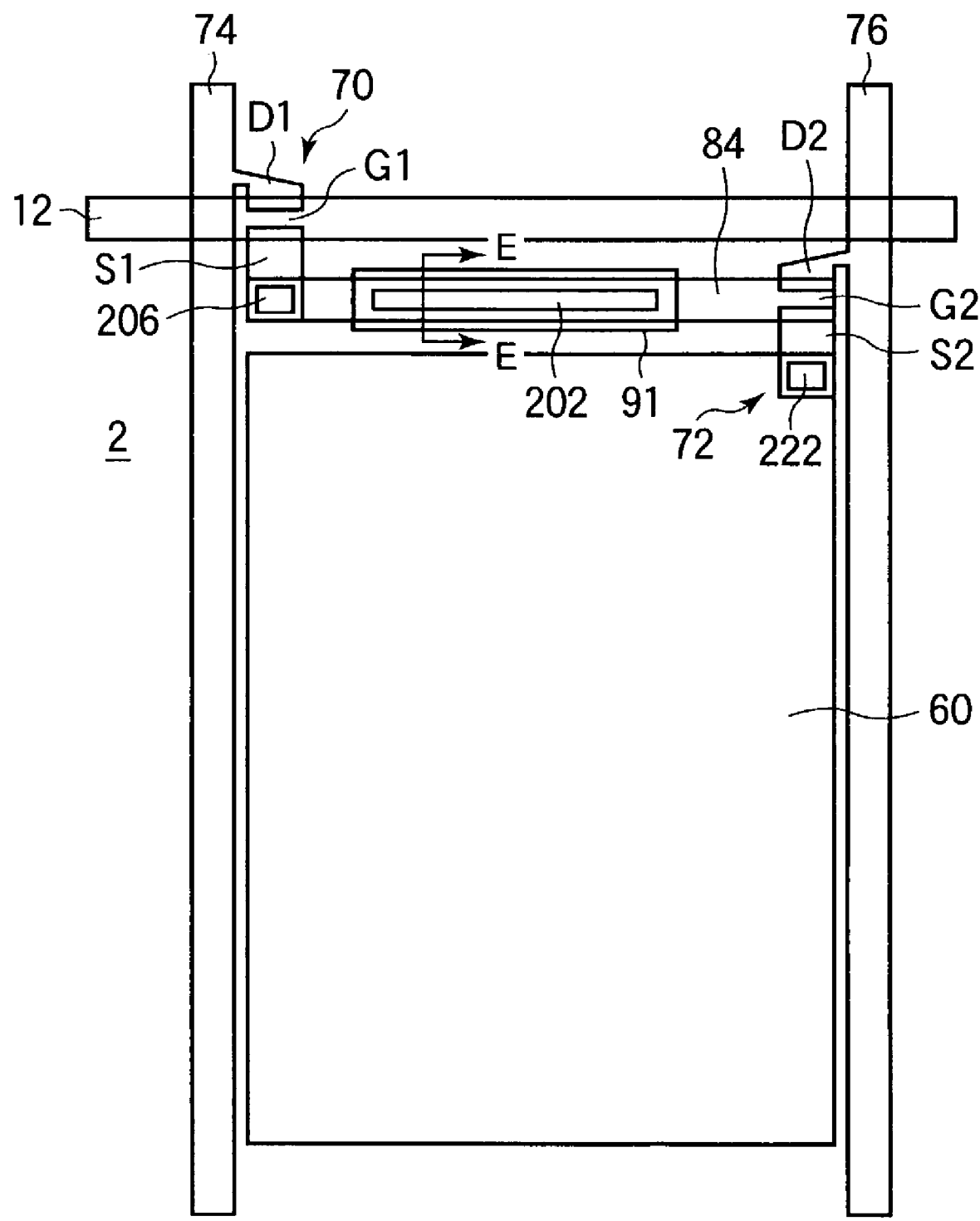
FIG. 12 is a view showing a modified example of the construction of the liquid crystal display device according to the example 1-2 of the first embodiment of the invention.
Figure 13:
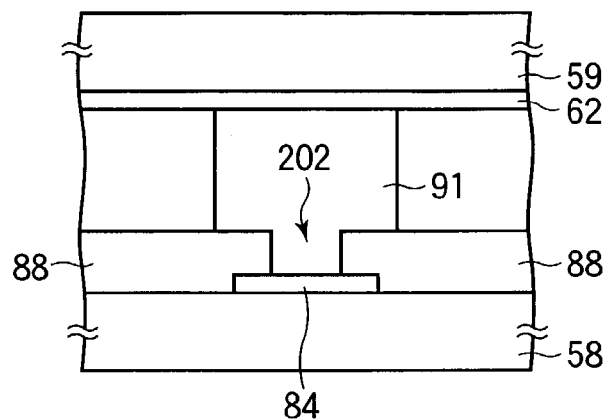
FIG. 13 is a sectional view showing the modified example of the construction of the liquid crystal display device according to the example 1-2 of the first embodiment of the invention.

Next, a modified example of the liquid crystal display device according to this example will be described. FIG. 12 shows the construction of a liquid crystal display device according to this modified example. FIG. 13 shows a section taken along line E-E of FIG. 12. As shown in FIGS. 12 and 13, in the liquid crystal display device according to this modified example, the common bus line 78 is not formed differently from the construction shown in FIG. 8. A contact hole 202 bored in an insulating film 88 is formed over a connection wiring line 84. A source electrode S1 of a TFT 70 is connected to the connection wiring line 84 and a common electrode 62 of an opposite substrate 4 through a resistor 91 formed on the contact hole 202. The resistor 91 is a pillar spacer having a predetermined cell thickness. As a formation material of the resistor 91, for example, a resist is preferable. In this modified example, the resistor 91 functions as the resistance R1 and the dielectric of the capacitance C1. Also in this example, the same effect as the above example can be obtained.

Figure 14:
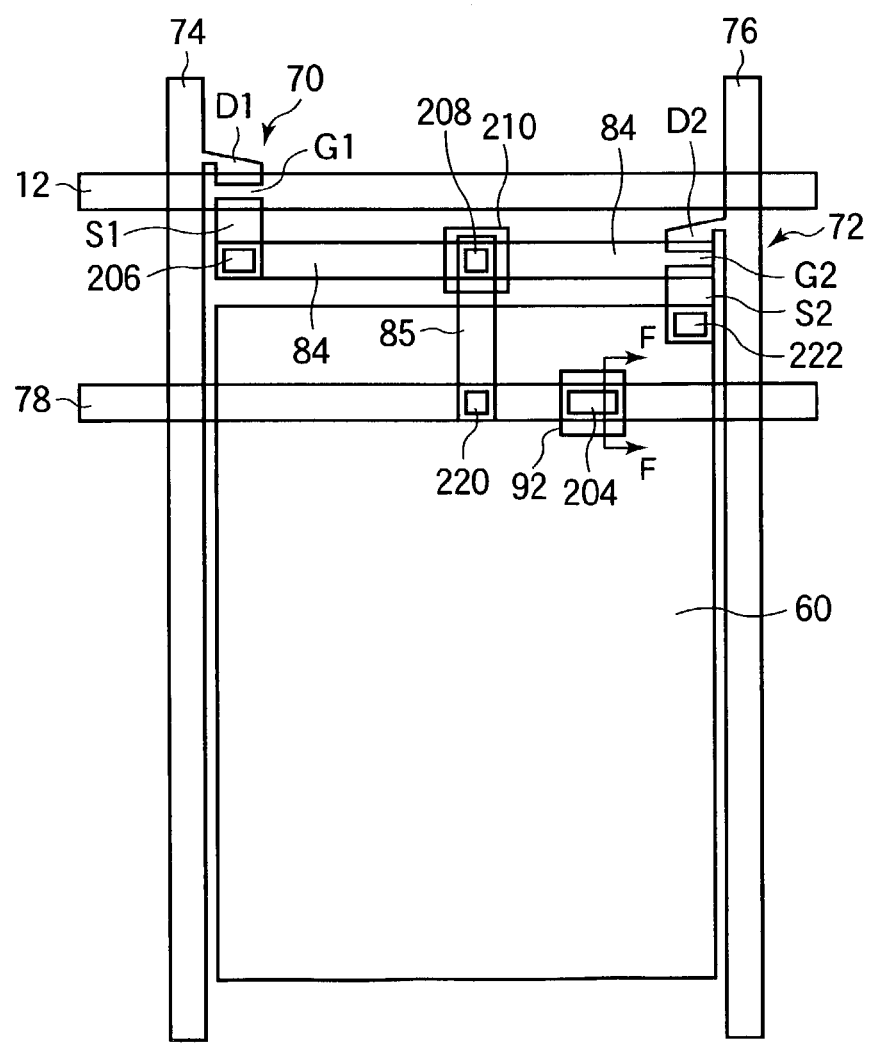
FIG. 14 is a sectional view showing a modified example of the construction of the liquid crystal display device according to the example 1-2 of the first embodiment of the invention.
Figure 15:
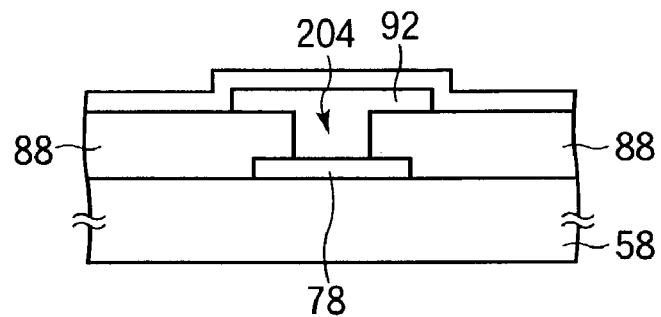
FIG. 15 is a sectional view showing the modified example of the construction of the liquid crystal display device according to the example 1-2 of the first embodiment of the invention.

Next, another modified example of the liquid crystal display device according to this example will be described. FIG. 14 shows the construction of a liquid crystal display device according to this modified example. FIG. 15 shows a section taken along line F-F of FIG. 14. In the liquid crystal display device according to this modified example, similarly to the construction shown in FIG. 8, a common bus line 78 is formed. A connection wiring line 84 is formed between a gate bus line 12 and the common bus line 78. A source electrode S1 of a TFT 70 is connected to one end of the connection wiring line 84 through a contact hole 206. The sectional construction of the vicinity of the contact hole 206 is similar to the vicinity of the contact hole 82 shown in FIG. 10. The connection wiring line 84 is connected through a resistor 210 formed on a contact hole 208 to one end of a second connection wiring line 85 formed of the same formation material as a data bus line 74 and a driving voltage bus line 76. The sectional construction of the vicinity of the contact hole 208 is similar to the vicinity of the contact hole 80 shown in FIG. 9. The other end of the second connection wiring line 85 is connected to the common bus line 78 through a contact hole 220. A pixel electrode 60 is connected to the common bus line 78 through a resistor 92 formed on a contact hole 204. In this modified example, the resistor 210 functions as the resistance R1 and the dielectric of the capacitance C1, and the resistor 92 functions as the resistance R2. Also according to this example, the same effect as the above example can be obtained.

As described above, according to this embodiment, it is possible to fabricate the liquid crystal display device in which excellent viewing angle characteristics can be obtained.

Second Embodiment

Figure 16:
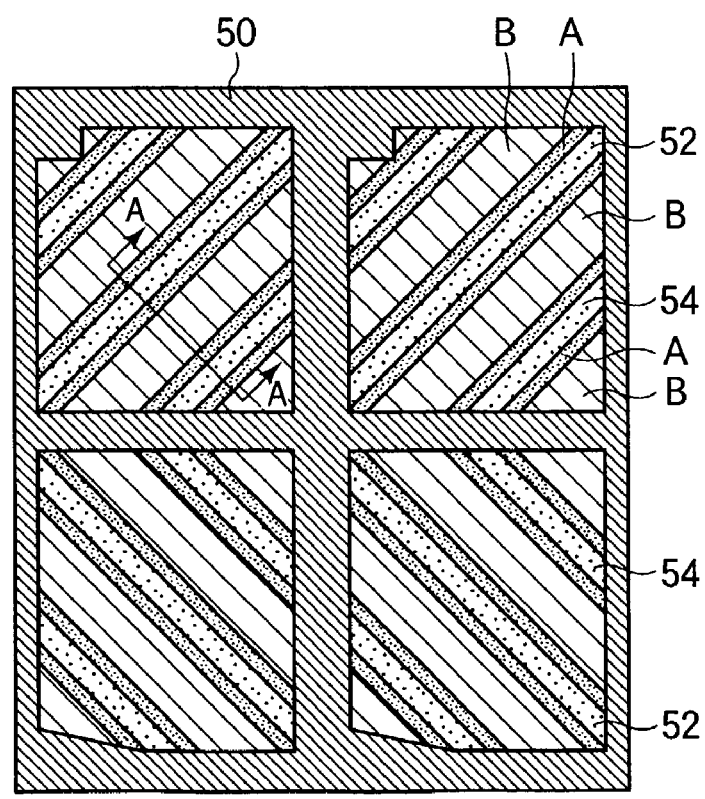
FIG. 16 is a view showing the construction of a liquid crystal display device according to a second embodiment of the invention.
Figure 17:
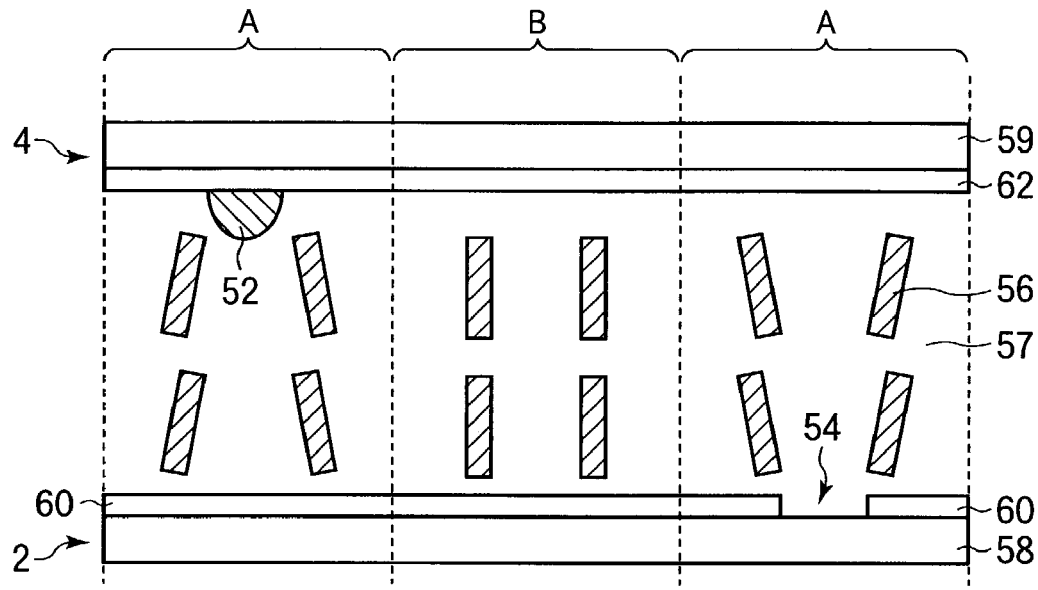
FIG. 17 is a sectional view showing the construction of the liquid crystal display device according to the second embodiment of the invention.

Next, a liquid crystal display device according to a second embodiment of the invention will be described with reference to FIGS. 16 to 19. Incidentally, structural elements having the same function and operation as the structural elements of the liquid crystal display device according to the first embodiment are designated by the same reference symbols and the explanation is omitted. FIG. 16 shows the basic construction of two pixels of the liquid crystal display device according to this embodiment when viewed from a display screen side. FIG. 17 shows a section of the liquid crystal display device taken along line A-A shown in FIG. 16. As shown in FIG. 16, two pixel regions of illustrated longitudinal rectangular shapes are defined by a light-shielding film (BM) 50 formed on an opposite substrate, and the inside of each pixel is divided in two in the longitudinal direction. Besides, as shown in FIGS. 16 and 17, linear protrusions 52 extending obliquely with respect to the a pixel region end part are formed in the respective pixel regions on the opposite substrate side. Slits 54 extending obliquely with respect to the pixel region end part are formed in the respective pixels on the TFT substrate side so that the slits 54 and the protrusions 52 are alternately disposed. The pixel region is divided by the protrusions 52 and the slits 54 into four regions (aligned regions) in which the alignment directions of liquid crystal molecules 56 are different from one another.

As shown in FIG. 17, each of the pixels includes a region A in the vicinity of a region where an alignment regulating structure such as the protrusion 52 or the slit 54 is formed, and a region B between the two regions A. A pre-tilt angle (angle from a substrate surface) of a liquid crystal molecule is different between the region A and the region B. Thus, when viewed locally, the regions A and B having two different T-V characteristics exist in one pixel. However, in an actual display observed on the whole, a T-V characteristic of the average of the respective T-V characteristics can be obtained.

It is necessary that, one of the plural divided regions A and B has a pre-tilt angle of approximately 90° (the alignment direction is almost vertical to the substrate surface) in order to keep high contrast. In this example, the pre-tilt angle of the region B is approximately 90°. Further, similarly, it is desirable that all the pre-tilt angles of the regions A and B are 80° or more in order to keep the high contrast. In this example, the pre-tilt angle of the liquid crystal molecule 56 in the region A is 80° or more. Besides, when the T-V characteristics of the respective regions A and B are equally averaged, a gradual T-V curved line can be obtained on the whole. When the gradual T-V curved line is obtained on the whole, a difference in transmission factor between the front direction and the oblique direction can be made small. Accordingly, it is desirable that the regions A and B are almost equally divided.

Next, a manufacturing method of the liquid crystal display device according to this example will be described. Vertical alignment films (made by, for example, JSR Corporation) are coated on opposite surfaces of the TFT substrate 2 on which the plural slits 54 each having a width of 10 μm are formed at intervals of 70 μm to be parallel to each other, and the opposite substrate 4 on which the plural linear insulating protrusions 52 each having a height of 1.2 μm and a width of 10 μm are formed at intervals of 70 μm to be parallel to each other. Next, for example, spherical spacers (made by, for example, Sekisui Fine Chemical Co., Ltd.) each having a diameter of 4.0 μm are scattered. Next, the TFT substrate 2 and the opposite substrate 4 are bonded so that the slits 54 and the protrusions 52 are alternately disposed, and an n-type liquid crystal (made by, for example Merck Ltd.) in which a photo-curing composition (made by, for example, Merck Ltd.) of 0.3 wt % is added is sealed. As shown in FIG. 16, the slits 54 and the protrusions 52 are formed to extend to the upper right, at 45° and a lower right, at 45° in one pixel. The liquid crystal inclination directions of the aligned regions alignment-divided by the slits 54 and the protrusions 52 in four directions become directions inclined by 45° from the vertical direction or the horizontal direction of the display screen. The areas of the respective aligned regions are almost equal in one pixel.

After the liquid crystal is sealed between the TFT substrate and the opposite substrate, in a state where a photomask patterned so that light is irradiated to only the region A having a width of 17.5 μm with respect to each of the alignment regulating structures as the center is stacked on a liquid crystal display panel, UV light with an irradiation energy of 4000 mJ is irradiated to the liquid crystal layer while a dc voltage of 20 V is applied between a pixel electrode 60 and a common electrode 62. By this, the photo-curing composition of the region A is selectively cured. Subsequently, in a state of no voltage application, UV light with an irradiation energy of 4000 mJ is irradiated on the whole surface of the liquid crystal display panel, and the photo-curing composition of the region B having a width of 17.5 μm is cured. By this process, the pre-tilt angle of the liquid crystal molecule in the region A becomes about 80°, and the pre-tilt angle of the liquid crystal molecule 56 in the region B becomes about 90°.

Figure 18:
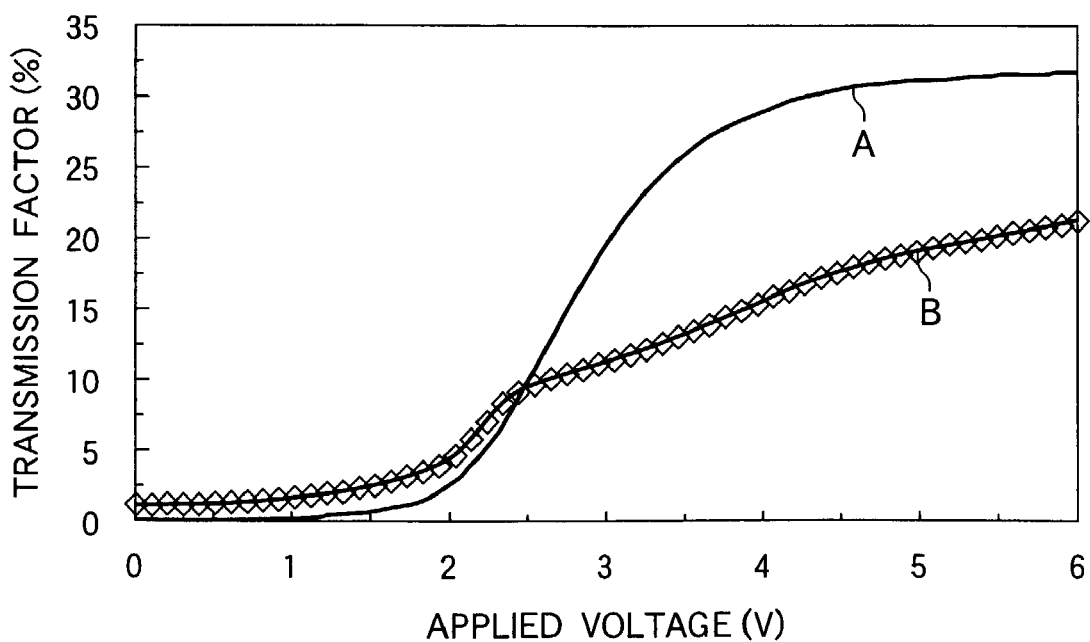
FIG. 18 is a graph showing T-V characteristics of the liquid crystal display device according to the second embodiment of the invention.

FIG. 18 shows T-V characteristics of the liquid crystal display device according to this example. The horizontal axis indicates applied voltage (V) to the liquid crystal layer 57, and the vertical axis indicates transmission factor (%) of light. A curved line A expressed by a solid line in the graph indicates the T-V characteristic in the front direction, and a curved line B expressed by a solid line plotted by ◇ marks indicates the T-V characteristic in the oblique direction. When the T-V characteristics shown in FIG. 18 are compared with the T-V characteristics of the conventional liquid crystal display device shown in FIG. 31, since a difference in transmission factor between the front direction and the oblique direction is small, excellent gradation viewing angle characteristics can be obtained in which the chromaticity shift of a display image between the front direction and the oblique direction is small. When several images are actually displayed on the liquid crystal display device, and the display screen is seen in the oblique direction, it is confirmed that in this embodiment, a difference from a display image seen in the front direction is small, and excellent gradation viewing angle characteristics are capable of being obtained. Incidentally, a conventional liquid crystal display device used for the comparison is manufactured under the same condition as this embodiment except that a photo-curing composition is not contained in a liquid crystal, and a UV light irradiation treatment is not performed.

In this embodiment, although the two regions A and B in which the pre-tilt angles of the liquid crystal molecules 56 are different from each other are formed, even if three or more regions where the pre-tilt angles of the liquid crystal molecules 56 are different from one another are formed, the same or more excellent display characteristics can be obtained. Besides, there is a trade-off relation that when the pre-tilt angle becomes small, more excellent gradation viewing angle characteristics can be obtained, however, the contrast is lowered. Thus, it is necessary to select the pre-tilt angle on the basis of use environment or the like of the liquid crystal display device.

Figure 19:
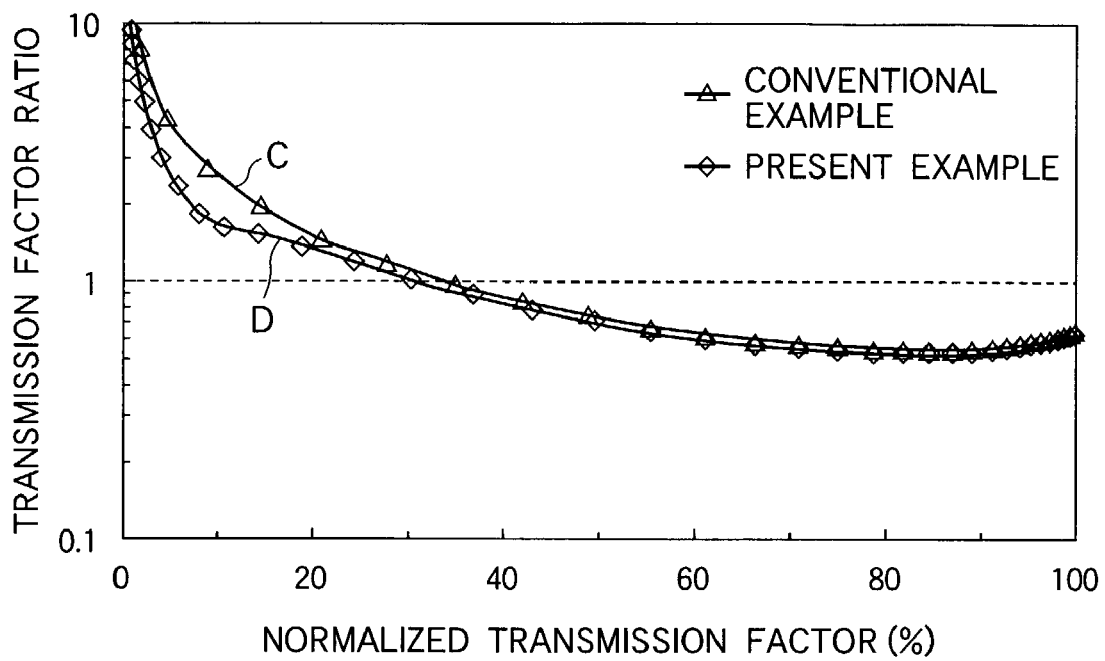
FIG. 19 is a graph showing an effect of the liquid crystal display device according to the second embodiment of the invention.

FIG. 19 is a graph showing the effect of the liquid crystal display device according to this example. The horizontal axis indicates normalized transmission factor, and each transmission factor is normalized by the transmission factor at the time when the gradation voltage is 6.0 V. The vertical axis indicates the logarithm of the ratio (transmission factor ratio) of the transmission factor in the oblique direction to the transmission factor in the front direction. A curved line C expressed by a solid line plotted by Δ marks in the graph indicates the transmission factor ratio of the conventional liquid crystal display device, and a curved line D expressed by a solid line plotted by ◇ marks indicates the transmission factor ratio of the liquid crystal display device according to this embodiment. As shown in FIG. 19, according to this embodiment, the transmission factor ratio at a low transmission factor, which is conventionally high, is lowered and the profile becomes flatter, and further, the transmission factor ratio is close to 1.0 on the whole. Accordingly, according to this embodiment, as compared with the conventional example, excellent gradation viewing angle characteristics can be obtained.

Third Embodiment

Figure 20A:
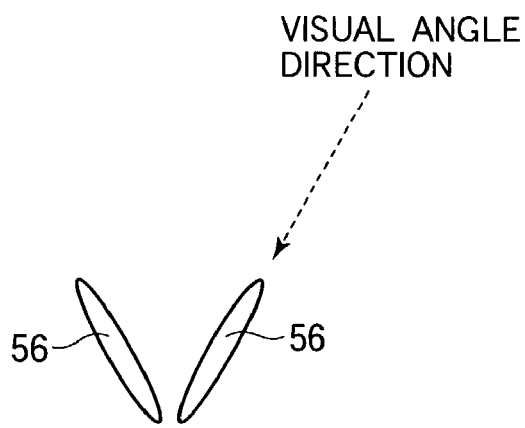
FIGS. 20A and 20B are views showing the principle of a liquid crystal display device according to a third embodiment of the invention.
Figure 20B:
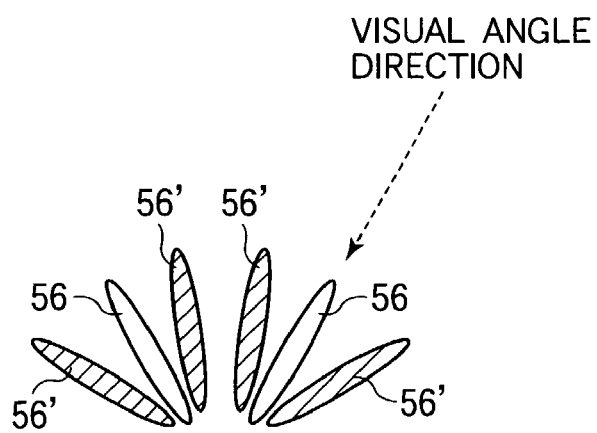

Next, a liquid crystal display device according to a third embodiment of the invention will be described with reference to FIGS. 20A to 26B. Incidentally, structural elements having the same function and operation as the structural elements of the liquid crystal display device according to the first and second embodiments are designated by the same reference symbols, and the explanation is omitted. First, the principle of the liquid crystal display device according to this embodiment will be described. FIGS. 20A and 20B show the relation between an inclination angle of a liquid crystal molecule of the liquid crystal display device according to this embodiment and a viewing angle direction. FIG. 20A shows the relation in a conventional liquid crystal display device, and FIG. 20B shows the relation in the liquid crystal display device according to this embodiment. As shown in FIG. 20A, in the conventional liquid crystal display device, there is a case where the retardation of a liquid crystal layer 57 when viewed in the oblique direction is changed by an inclination angle of a liquid crystal molecule 56. For example, in the liquid crystal layer in which the major axis of the molecule is aligned in the viewing angle direction of an arrow in the drawing, the retardation in the viewing angle direction becomes minimum. On the other hand, in the liquid crystal display device according to this embodiment, like liquid crystal molecules 56 and 56' shown in FIG. 20B, plural regions in which inclination angles gradually vary are provided in one pixel, so that a substantial variation in retardation when viewed in the oblique direction is suppressed.

Figure 21:
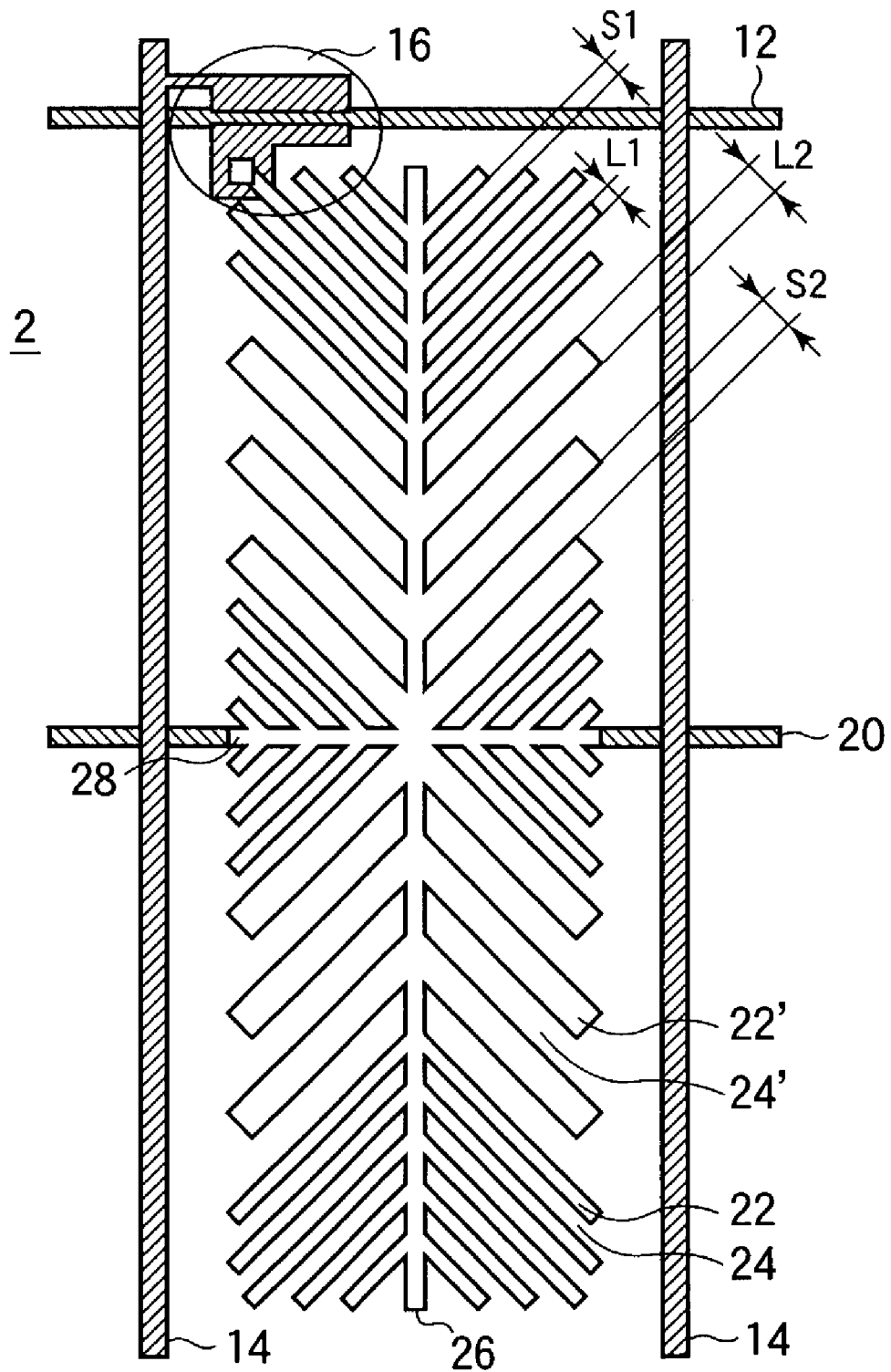
FIG. 21 is a view showing the construction of the liquid crystal display device according to the third embodiment of the invention.

The liquid crystal display device according to this embodiment is characterized in that the pre-tilt angles of the liquid crystal molecules 56 and 56' are made to vary in one pixel similarly to the second embodiment. FIG. 21 shows the construction of the liquid crystal display device according to this embodiment. As shown in FIG. 21, plural gate bus lines 12 extending in the horizontal direction in the drawing and plural drain bus lines 14 intersecting the gate bus lines 12 through a not-shown insulating film and extending in the vertical direction in the drawing are formed on a TFT substrate 2. A TFT 16 is formed in the vicinity of an intersection position of the gate bus line 12 and the drain bus line 14. A storage capacitor bus line 20 is formed to cross substantially the center of a rectangular pixel region defined by the gate bus line 12 and the drain bus line 14.

Cross-shaped connection electrodes 26 and 28 dividing the pixel region in four rectangles of the same shape are formed in the rectangular pixel region. The connection electrode 26 is formed to be parallel to the drain bus line 14 in the center of the pixel region, and the connection electrode 28 is formed on the storage capacitor bus line 20. Plural stripe electrodes 22 and 22' of a minute electrode pattern extending at an angle of 45° from the connection electrodes 26 and 28 are formed. Each of the stripe electrodes 22 is formed to have a width L1, and each of the stripe electrodes 22' is formed to have a width L2 (>L1). A space 24 in a state where an electrode is removed is formed between the adjacent stripe electrodes 22. Besides, a space 24' is formed between the adjacent stripe electrodes 22'. The space 24 is formed to have a width S1, and the space 24' is formed to have a width S2 (>S1). A pixel electrode is constituted by the connection electrodes 26 and 28, the plural stripe electrodes 22 and 22', and the spaces 24 and 24', and partial stripe electrodes 22 and 22' are electrically connected to a source electrode of the TFT 16. The stripe electrodes 22 and 22' and the spaces 24 and 24' constitute alignment regulating structures.

Figure 22:
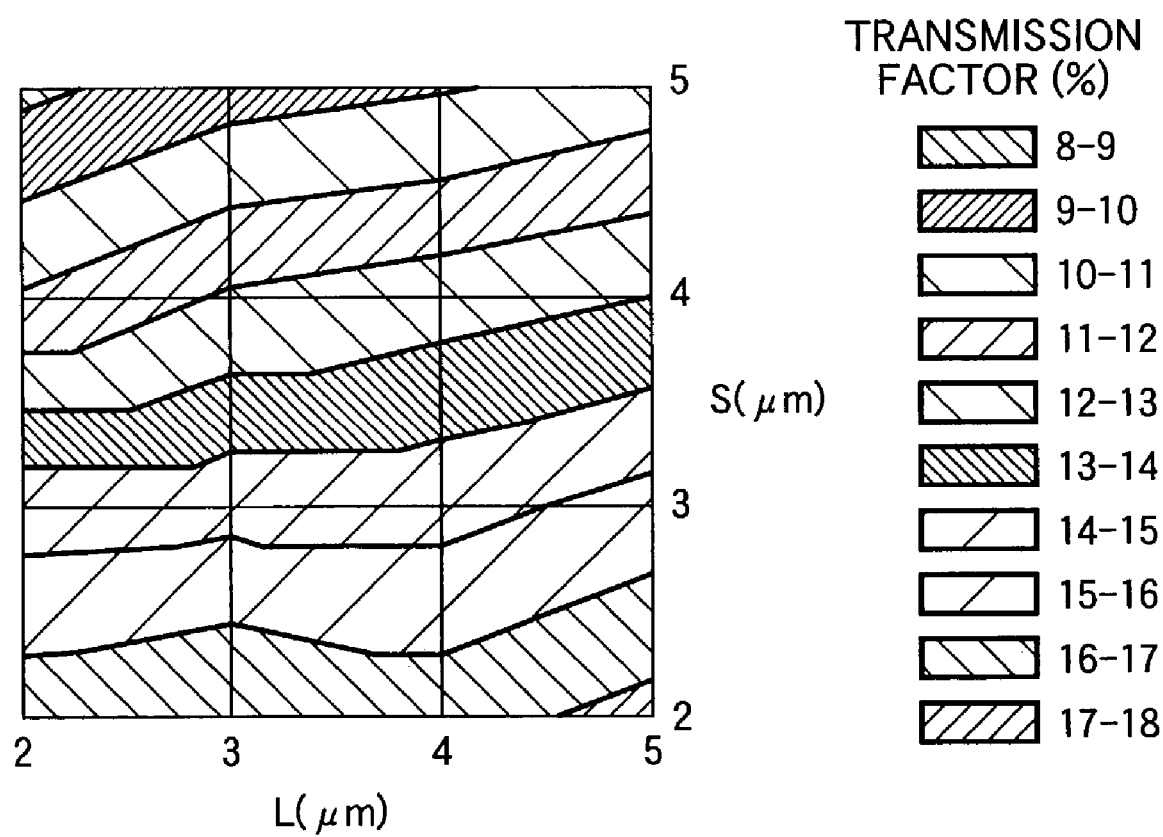
FIG. 22 is a graph showing an effect of the liquid crystal display device according to the third embodiment of the invention.

FIG. 22 is a graph showing the change of transmission factor with respect to the change of the widths of the stripe electrode 22 and the space 24 in the liquid crystal display device according to this embodiment. The horizontal axis indicates the width L (μm) of the stripe electrode 22, and the vertical axis indicates the width S (μm) of the space 24. The transmission factor (%) indicates the transmission factor in the front direction when a voltage of 3.4 V is applied to the liquid crystal layer 57.

As shown in FIG. 22, when the widths L of the stripe electrodes 22 and 22' are formed to be wide, and the widths S of the spaces 24 and 24' are formed to be narrow, the transmission factor at the time when a predetermined voltage is applied becomes high. As is apparent from FIG. 22, the transmission factor is changed at a high sensitivity in the vertical axis direction, that is, with respect to the change of the widths S of the spaces 24 and 24'.

As stated above, when the stripe electrodes 22 and 22' and the spaces 24 and 24' are formed to have different widths in one pixel, plural T-V characteristics locally different from each other can be obtained in one pixel. Accordingly, a gradation display can be obtained as one T-V characteristic of the average of the plural T-V characteristics.

Figure 23:
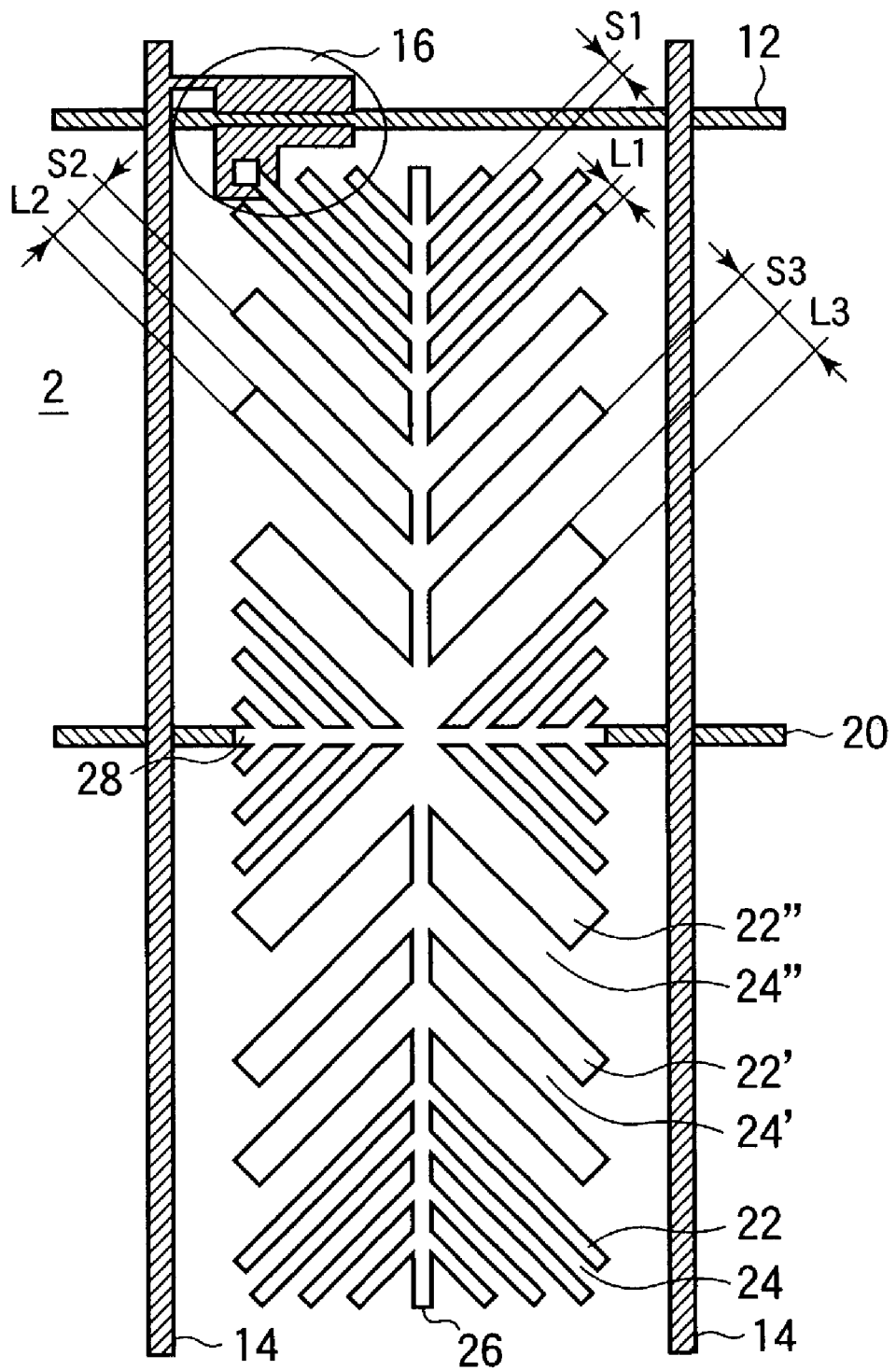
FIG. 23 is a view showing a modified example of the construction of the liquid crystal display device according to the third embodiment of the invention.

FIG. 23 shows a modified example of the liquid crystal display device according to this embodiment. As shown in FIG. 23, in this modified example, stripe electrodes 22, 22' and 22'' are formed to have three different widths L1, L2 and L3, and spaces 24, 24' and 24'' are formed to have three different widths S1, S2 and S3.

Figure 24:
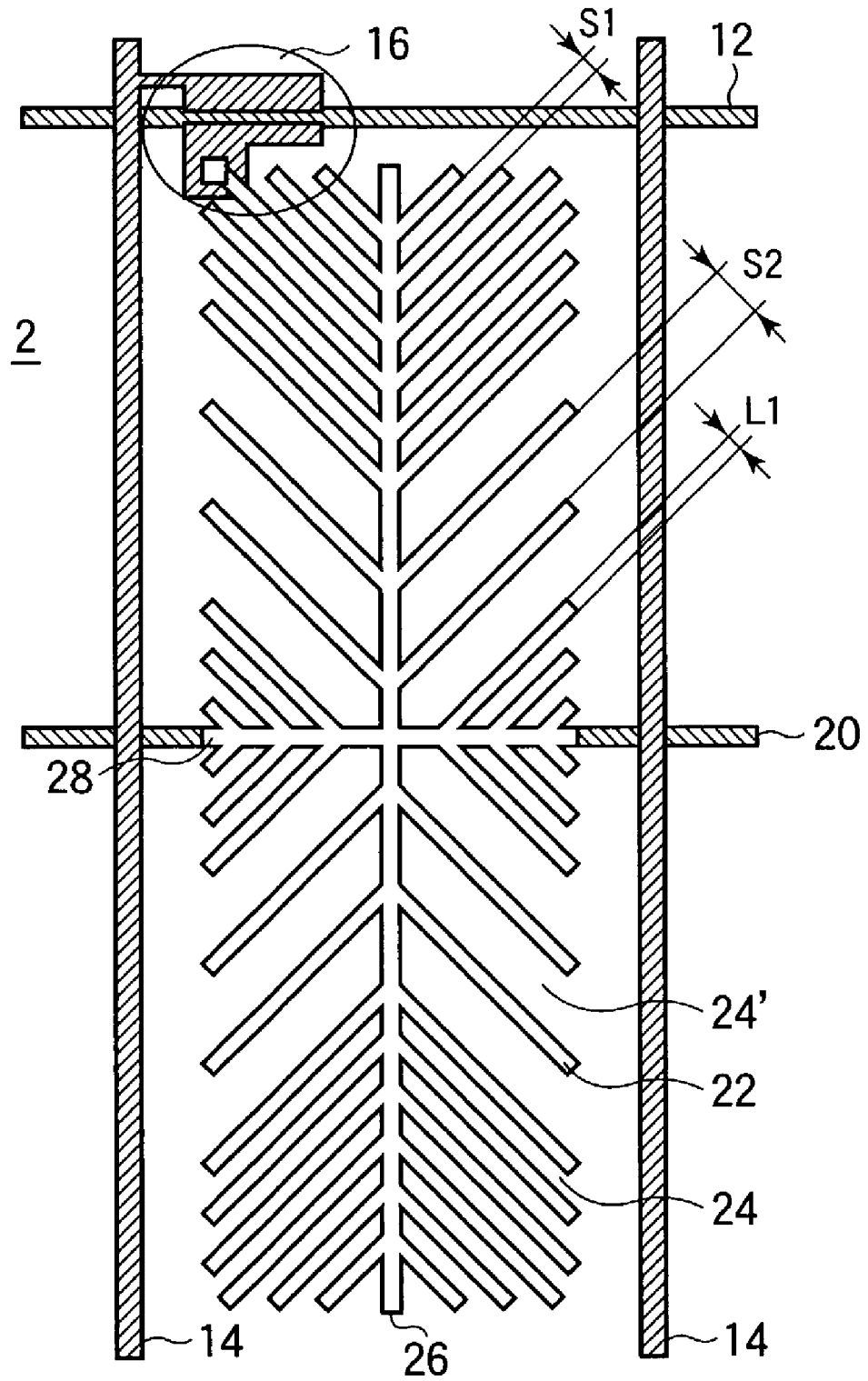
FIG. 24 is a view showing another modified example of the construction of the liquid crystal display device according to the third embodiment of the invention.

FIG. 24 shows another modified example of the liquid crystal display device according to this embodiment. As shown in FIG. 24, in this modified example, stripe electrodes 22 are formed to have substantially the same width Li, and spaces 24 and 24' are respectively formed to have two different widths S1 and S2.

Figure 25:
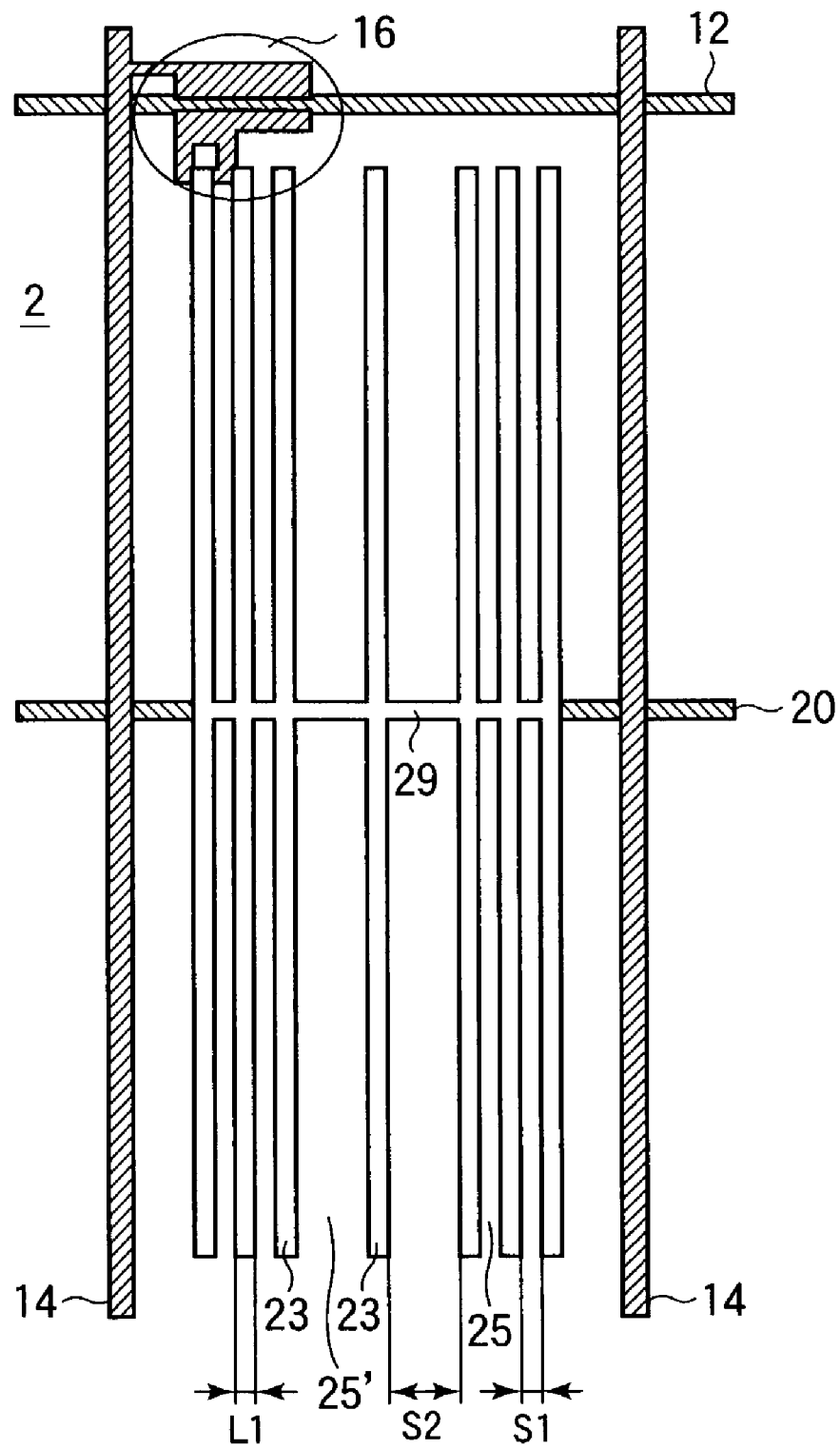
FIG. 25 is a view showing still another modified example of the construction of the liquid crystal display device according to the third embodiment of the invention.

FIG. 25 shows still another modified example of the liquid crystal display device according to this embodiment. As shown in FIG. 25, in this modified example, plural stripe electrodes 23 and plural spaces 25 and 25' are formed to be parallel to a drain bus line 14. The stripe electrodes 23 are formed to have substantially the same width LI, and the spaces 25 and 25' are formed to have different widths S1 and S2, respectively. The plural stripe electrodes 23 are electrically connected to one another by a connection electrode 29 formed in substantially the center of a pixel region to be parallel to a gate bus line 12. Part of the stripe electrodes 23 is electrically connected to a source electrode of a TFT 16.

Figure 26A:
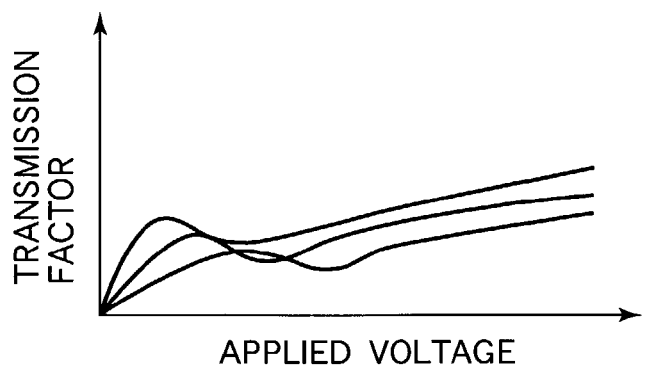
FIGS. 26A and 26B are graphs showing an effect of the liquid crystal display device according to the third embodiment of the invention.
Figure 26B:
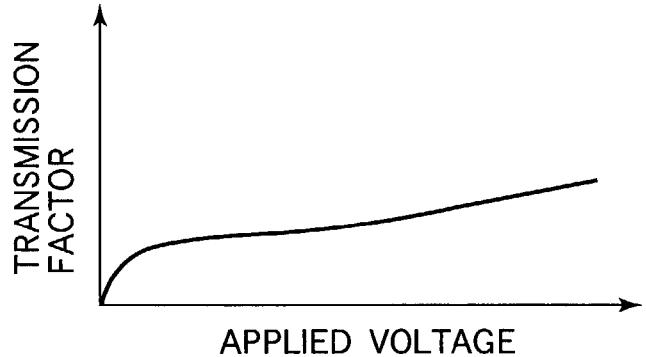

FIGS. 26A and 26B are graphs showing effects of this embodiment. FIG. 26A shows local T-V characteristics in respective regions in the case where three regions having different T-V characteristics are formed in one pixel in the liquid crystal display device according to this embodiment. Besides, FIG. 26B shows an averaged T-V characteristic of the case where three regions having different T-V characteristics are almost uniformly formed in one pixel. In both the graphs, the horizontal axis indicates applied voltage, and the vertical axis indicates transmission factor.

Figure 32:
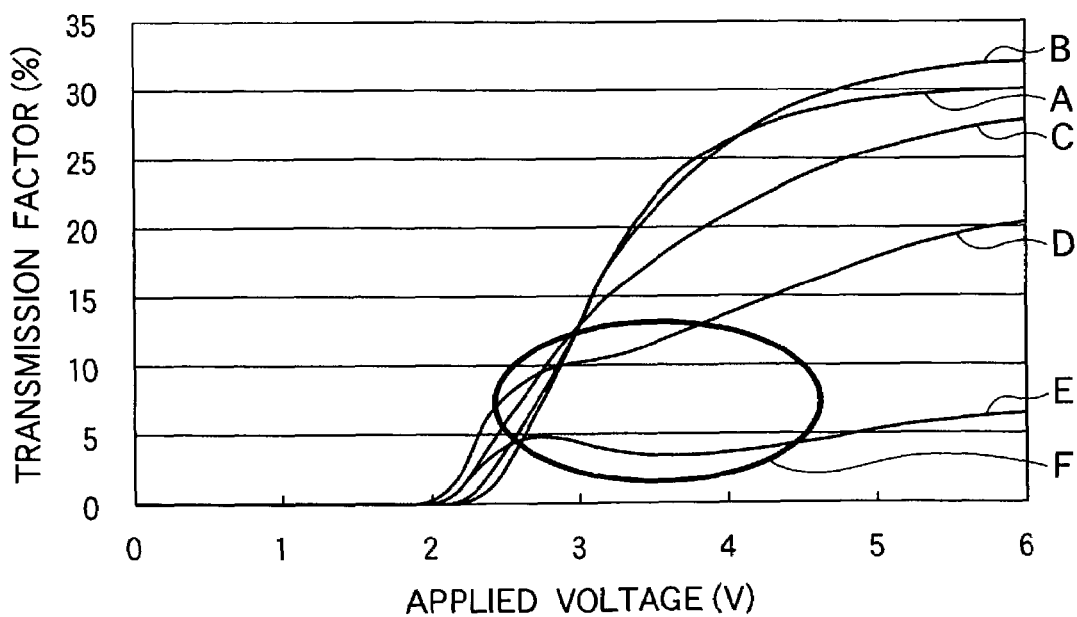
FIG. 32 is a graph showing T-V characteristics of the conventional MVA mode liquid crystal display device.

As shown in FIG. 26B, by substantially uniformly forming the three regions having different T-V characteristics in one pixel, the three T-V characteristics shown in FIG. 26A are uniformly mixed, and consequently, one T-V curve can be obtained which is smooth on the whole and in which undulation does not occur. Accordingly, it becomes possible to eliminate such a viewing angle that gradation reversal as shown in FIG. 32 occurs, and the display characteristics of the liquid crystal display device can be greatly improved.

Next, a manufacturing method of the liquid crystal display device according to this embodiment will be described. A film of, for example, ITO (Indium Tin Oxide) is formed on a glass substrate on which the TFT 16 is formed, and is patterned to form the pixel electrodes having the minute electrode pattern as shown in FIG. 21. Next, vertical alignment films made of polyimide or the like are formed on the TFT substrate 2 and the opposite substrate 4. Next, the TFT substrate 2 and the opposite substrate 4 are bonded at a predetermined position. Next, a liquid crystal composition in which a liquid crystal having a negative dielectric anisotropy and a monomer capable of being polymerized by UV light are mixed is sealed between the substrates 2 and 4.

Next, a gate voltage (for example, DC 30 V) and a gradation voltage (for example, DC 5V) are applied to a liquid crystal display panel in which the liquid crystal is sealed. At this time, the common electrode of the opposite substrate 4 is kept at a ground potential. The voltage is applied to the liquid crystal layer 57, so that the liquid crystal molecules 56 are gradually aligned into a stable state. In this state, UV light is irradiated to form a photo-cured material in the liquid crystal layer 57. A polarizing plate having a predetermined optic axis is bonded to the liquid crystal display panel at a predetermined arrangement, so that the liquid crystal display device is completed.

The invention is not limited to the above embodiment, but can be variously modified.

For example, in the above embodiment, although the MVA mode liquid crystal display device has been taken as an example, the invention is not limited to this, but can be applied to another liquid crystal display device such as a TN mode one.

Besides, in the above embodiment, although the normally black mode liquid crystal display device has been taken as an example, the invention is not limited to this, but can be applied to a normally white mode liquid crystal display device.

Further, in the above embodiment, although the transmission-type liquid crystal display device has been taken as an example, the invention is not limited to this, but can be applied to another liquid crystal display device such as a reflection type or transflective type one.

As described above, according to the invention, the liquid crystal display device can be realized in which excellent viewing angle characteristics can be obtained.

What is claimed is:

1. A driving method of a liquid crystal display device, comprising the steps of:
   applying a data voltage from a data voltage line to a first thin film transistor in a pixel;
   applying a driving voltage from a driving voltage line to a second thin film transistor in the pixel only in a predetermined time in one frame period; and
   displaying a predetermined gradation to the pixel by changing an application time of the driving voltage in accordance with a magnitude of the data voltage from the first thin film transistor applied to a gate electrode of the second thin film transistor.

2. A driving method of a liquid crystal display device according to claim 1, wherein the driving voltage is set to a voltage or within a voltage range in which the liquid crystal can perform a high speed response.

3. A driving method of a liquid crystal display device according to claim 1, wherein the liquid crystal is aligned almost vertically to or parallel to a substrate surface at a time when the driving voltage is applied or at a time when the driving voltage is not applied.

4. A liquid crystal display device comprising:
   a pair of substrates disposed to be opposite to each other;
   a liquid crystal sealed between the pair of substrates;
   a gate bus line formed on one of the substrates;
   a data bus line formed to intersect the gate bus line through an insulating film, to which a predetermined gradation voltage is applied;
   a first thin film transistor formed in a vicinity of an intersection position of the gate bus line and the data bus line;
   a second thin film transistor, a gate electrode of which is connected to a source electrode of the first thin film transistor;
   a pixel electrode connected to a source electrode of the second thin film transistor;
   a driving voltage bus line which is connected to a drain electrode of the second thin film transistor and to which a driving voltage to drive the liquid crystal is applied; and
   a first capacitance and a first resistance connected in parallel with each other at a side of the source electrode of the first thin film transistor.

5. A liquid crystal display device according to claim 4, further comprising a second capacitance and a second resistance connected in parallel with each other at a side of the source electrode of the second thin film transistor.

6. A liquid crystal display device according to claim 5, wherein the second capacitance is a liquid crystal capacitance.

7. A liquid crystal display device according to claim 4, wherein the pair of substrates respectively include vertical alignment films on opposite surfaces, and the liquid crystal has a negative dielectric anisotropy.

8. A liquid crystal display device comprising:
   a pair of substrates disposed to be opposite to each other;
   a liquid crystal sealed between the pair of substrates; and
   pixels disposed in a matrix form and including a plurality of aligned regions, each of the aligned regions further having a plurality of sub-regions where pre-tilt angles of the liquid crystal are different from each other, wherein the liquid crystal includes a photo-cured material which is obtained by curing a photo-curing composition, and
   the pre-tilt angle of at least one of the sub-regions is regulated by the photo-cured material.

9. A liquid crystal display device according to claim 8, wherein the pre-tilt angle of at least one of the sub-regions is about 90°.

10. A liquid crystal display device according to claim 8, wherein the pre-tilt angle of all sub-regions is 80° or more.

11. A liquid crystal display device according to claim 8, wherein the plurality of aligned regions are substantially equally divided.

12. A liquid crystal display device according to claim 8, wherein the pre-tilt angle of at least a first one of the sub-regions is regulated by the photo-cured material cured in the first sub-region with a voltage applied to the liquid crystal, and the pre-tilt angle of at least a second one of the sub-regions is regulated by the photo-cured material cured in the second sub-region while no voltage is applied to the liquid crystal.

13. A liquid crystal display device according to claim 8, wherein the pair of substrates respectively include vertical alignment films on opposite surfaces, and the liquid crystal has a negative dielectric anisotropy.

14. A liquid crystal display device comprising:
   a pair of substrates disposed to be opposite to each other;
   a liquid crystal sealed between the pair of substrates;
   a plurality of pixel regions disposed in a matrix form; and
   a pixel electrode formed in each of the pixel regions, including a plurality of stripe electrodes and spaces between the stripe electrodes, some of the plurality of stripe electrodes and spaces being formed to have different widths from each other.

15. A liquid crystal display device according to claim 14, wherein the liquid crystal includes a photo-cured material which is obtained by curing a photo-curing composition, and a pre-tilt angle is regulated by the photo-cured material.

16. A liquid crystal display device according to claim 14, wherein the pair of substrates respectively include vertical alignment films on opposite surfaces, and
   the liquid crystal has a negative dielectric anisotropy.

* * * * *